(12) United States Patent
Ciesla et al.

(10) Patent No.: US 8,179,375 B2
(45) Date of Patent: *May 15, 2012

(54) USER INTERFACE SYSTEM AND METHOD

(75) Inventors: Craig Michael Ciesla, Mountain View, CA (US); Micah B. Yairi, Palo Alto, CA (US)

(73) Assignee: Tactus Technology, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,622

(22) Filed: Jul. 3, 2009

(65) Prior Publication Data

US 2010/0103137 A1 Apr. 29, 2010

Related U.S. Application Data

(63) Continuation-in-part of application No. 11/969,848, filed on Jan. 4, 2008, and a continuation-in-part of application No. 12/319,334, filed on Jan. 5, 2009.

(51) Int. Cl.
*G06F 3/041* (2006.01)
*G08B 6/00* (2006.01)
*G09B 21/00* (2006.01)

(52) U.S. Cl. ............... 345/173; 178/18.01; 434/114; 340/407.2

(58) Field of Classification Search .......... 345/173–179, 345/168–169, 104, 172; 463/37–38; 455/466; 178/18.01–20.02; 200/600; 434/112–117; 340/407.1–407.2

See application file for complete search history.

(56) References Cited

U.S. PATENT DOCUMENTS

| 3,034,628 | A |   | 5/1962 | Wadey |
|---|---|---|---|---|
| 3,659,354 | A | * | 5/1972 | Sutherland ................. 434/113 |
| 3,818,487 | A | * | 6/1974 | Brody et al. ............... 340/407.1 |
| 4,109,118 | A |   | 8/1978 | Kley |
| 4,209,819 | A |   | 6/1980 | Seignemartin |

(Continued)

FOREIGN PATENT DOCUMENTS

WO 2008037275 A1 4/2008

OTHER PUBLICATIONS

Optical Society of America, Optics Express; vol. 12, No. 11. May 31, 2004, 7 pages, Jeong, Ki-Hun , et al. "Tunable Microdoublet Lens Array".

(Continued)

*Primary Examiner* — Bipin Shalwala
*Assistant Examiner* — Jonathan King
(74) *Attorney, Agent, or Firm* — Jeffrey Schox

(57) ABSTRACT

The user interface system of the preferred embodiments includes a sheet that defines a surface on one side and at least partially defines a cavity on an opposite side; a volume of a fluid contained within the cavity; a displacement device that modifies the volume of the fluid to expand the cavity, thereby outwardly deforming a particular region of the surface; and a sensor that detects a force applied by a user that inwardly deforms the particular region of the surface. The user interface system has been specifically designed to be used as the user interface for an electronic device, more preferably in an electronic device that benefits from an adaptive user interface, but may alternatively be used in any suitable application.

44 Claims, 13 Drawing Sheets

U.S. PATENT DOCUMENTS

| | | | |
|---|---|---|---|
| 4,307,268 A | 12/1981 | Harper | |
| 4,467,321 A * | 8/1984 | Volnak | 341/23 |
| 4,477,700 A | 10/1984 | Balash et al. | |
| 4,517,421 A | 5/1985 | Margolin | |
| 4,543,000 A | 9/1985 | Hasenbalg | |
| 4,920,343 A * | 4/1990 | Schwartz | 341/33 |
| 5,194,852 A | 3/1993 | More et al. | |
| 5,195,659 A * | 3/1993 | Eiskant | 222/102 |
| 5,222,895 A * | 6/1993 | Fricke | 434/113 |
| 5,286,199 A * | 2/1994 | Kipke | 434/114 |
| 5,369,228 A * | 11/1994 | Faust | 178/18.05 |
| 5,412,189 A | 5/1995 | Cragun | |
| 5,488,204 A | 1/1996 | Mead et al. | |
| 5,496,174 A * | 3/1996 | Garner | 434/114 |
| 5,742,241 A | 4/1998 | Crowley et al. | |
| 5,754,023 A | 5/1998 | Roston et al. | |
| 5,766,013 A * | 6/1998 | Vuyk | 434/114 |
| 5,835,080 A | 11/1998 | Beeteson et al. | |
| 5,880,411 A | 3/1999 | Gillespie et al. | |
| 5,917,906 A * | 6/1999 | Thornton | 379/433.07 |
| 5,943,043 A | 8/1999 | Furuhata et al. | |
| 5,977,867 A | 11/1999 | Blouin | |
| 5,982,304 A | 11/1999 | Selker et al. | |
| 6,188,391 B1 | 2/2001 | Seely et al. | |
| 6,218,966 B1 | 4/2001 | Goodwin et al. | |
| 6,310,614 B1 * | 10/2001 | Maeda et al. | 345/173 |
| 6,323,846 B1 | 11/2001 | Westerman et al. | |
| 6,337,678 B1 | 1/2002 | Fish | |
| 6,356,259 B1 | 3/2002 | Maeda et al. | |
| 6,384,743 B1 * | 5/2002 | Vanderheiden | 341/21 |
| 6,429,846 B2 | 8/2002 | Rosenberg et al. | |
| 6,462,294 B2 | 10/2002 | Davidson et al. | |
| 6,498,353 B2 | 12/2002 | Nagle et al. | |
| 6,501,462 B1 * | 12/2002 | Garner | 345/173 |
| 6,636,202 B2 * | 10/2003 | Ishmael et al. | 345/173 |
| 6,655,788 B1 | 12/2003 | Freeman | |
| 6,657,614 B1 * | 12/2003 | Ito et al. | 345/168 |
| 6,667,738 B2 * | 12/2003 | Murphy | 345/173 |
| 6,700,556 B2 | 3/2004 | Richley et al. | |
| 6,703,924 B2 | 3/2004 | Tecu et al. | |
| 6,743,021 B2 * | 6/2004 | Prince et al. | 434/113 |
| 6,819,316 B2 | 11/2004 | Schulz et al. | |
| 6,861,961 B2 | 3/2005 | Sandbach et al. | |
| 6,877,986 B2 * | 4/2005 | Fournier et al. | 434/112 |
| 6,881,063 B2 * | 4/2005 | Yang | 434/114 |
| 6,930,234 B2 | 8/2005 | Davis | |
| 7,064,655 B2 | 6/2006 | Murray et al. | |
| 7,081,888 B2 * | 7/2006 | Cok et al. | 345/173 |
| 7,096,852 B2 | 8/2006 | Gregario | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,131,073 B2 | 10/2006 | Rosenberg et al. | |
| 7,136,045 B2 | 11/2006 | Rosenberg et al. | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,233,313 B2 | 6/2007 | Levin et al. | |
| 7,233,315 B2 | 6/2007 | Gregorio et al. | |
| 7,233,476 B2 | 6/2007 | Goldenberg et al. | |
| 7,236,157 B2 | 6/2007 | Schena et al. | |
| 7,245,202 B2 | 7/2007 | Levin | |
| 7,245,292 B1 * | 7/2007 | Custy | 345/173 |
| 7,249,951 B2 | 7/2007 | Bevirt et al. | |
| 7,250,128 B2 * | 7/2007 | Unger et al. | 264/155 |
| 7,253,803 B2 | 8/2007 | Schena et al. | |
| 7,265,750 B2 | 9/2007 | Rosenberg | |
| 7,280,095 B2 | 10/2007 | Grant | |
| 7,283,120 B2 | 10/2007 | Grant | |
| 7,283,123 B2 | 10/2007 | Braun et al. | |
| 7,289,106 B2 | 10/2007 | Bailey et al. | |
| 7,307,619 B2 | 12/2007 | Cunningham et al. | |
| 7,308,831 B2 | 12/2007 | Cunningham et al. | |
| 7,319,374 B2 | 1/2008 | Shahoian | |
| 7,336,260 B2 | 2/2008 | Martin et al. | |
| 7,336,266 B2 | 2/2008 | Hayward et al. | |
| 7,339,572 B2 | 3/2008 | Schena | |
| 7,342,573 B2 | 3/2008 | Ryynanen | |
| 7,369,115 B2 | 5/2008 | Cruz-Hernandez et al. | |
| 7,382,357 B2 | 6/2008 | Panotopoulos et al. | |
| 7,397,466 B2 * | 7/2008 | Bourdelais et al. | 345/173 |
| 7,432,910 B2 | 10/2008 | Shahoian | |
| 7,432,911 B2 | 10/2008 | Skarine | |
| 7,432,912 B2 * | 10/2008 | Cote et al. | 345/169 |
| 7,433,719 B2 | 10/2008 | Dabov | |
| 7,471,280 B2 * | 12/2008 | Prins | 345/156 |
| 7,522,152 B2 | 4/2009 | Olien et al. | |
| 7,545,289 B2 | 6/2009 | Mackey et al. | |
| 7,548,232 B2 | 6/2009 | Shahoian et al. | |
| 7,567,232 B2 | 7/2009 | Rosenberg | |
| 7,567,243 B2 | 7/2009 | Hayward | |
| 7,589,714 B2 | 9/2009 | Funaki | |
| 7,659,885 B2 * | 2/2010 | Kraus et al. | 345/168 |
| 7,920,131 B2 * | 4/2011 | Westerman | 345/173 |
| 7,989,181 B2 * | 8/2011 | Blattner et al. | 435/69.1 |
| 2001/0043189 A1 * | 11/2001 | Brisebois et al. | 345/156 |
| 2002/0110237 A1 | 8/2002 | Krishnan | |
| 2003/0179190 A1 * | 9/2003 | Franzen | 345/173 |
| 2004/0164968 A1 * | 8/2004 | Miyamoto | 345/173 |
| 2005/0007339 A1 * | 1/2005 | Sato | 345/156 |
| 2005/0007349 A1 | 1/2005 | Vakil et al. | |
| 2005/0020325 A1 | 1/2005 | Enger et al. | |
| 2005/0030292 A1 * | 2/2005 | Diederiks | 345/173 |
| 2005/0057528 A1 * | 3/2005 | Kleen | 345/173 |
| 2005/0088417 A1 * | 4/2005 | Mulligan | 345/173 |
| 2005/0110768 A1 | 5/2005 | Marriott et al. | |
| 2005/0162408 A1 * | 7/2005 | Martchovsky | 345/173 |
| 2005/0231489 A1 | 10/2005 | Ladouceur et al. | |
| 2005/0285846 A1 * | 12/2005 | Funaki | 345/173 |
| 2006/0026521 A1 | 2/2006 | Hotelling et al. | |
| 2006/0097991 A1 | 5/2006 | Hotelling et al. | |
| 2006/0098148 A1 * | 5/2006 | Kobayashi et al. | 349/130 |
| 2006/0118610 A1 | 6/2006 | Pihlaja et al. | |
| 2006/0119586 A1 * | 6/2006 | Grant et al. | 345/173 |
| 2006/0197753 A1 | 9/2006 | Hotelling | |
| 2006/0214923 A1 * | 9/2006 | Chiu et al. | 345/173 |
| 2006/0238510 A1 * | 10/2006 | Panotopoulos et al. | 345/168 |
| 2006/0256075 A1 | 11/2006 | Anastas et al. | |
| 2006/0278444 A1 * | 12/2006 | Binstead | 178/18.06 |
| 2007/0013662 A1 | 1/2007 | Fauth | |
| 2007/0085837 A1 * | 4/2007 | Ricks et al. | 345/173 |
| 2007/0122314 A1 * | 5/2007 | Strand et al. | 422/100 |
| 2007/0152983 A1 | 7/2007 | Mead et al. | |
| 2007/0165004 A1 * | 7/2007 | Seelhammer et al. | 345/173 |
| 2007/0171210 A1 | 7/2007 | Chaudhri et al. | |
| 2007/0182718 A1 * | 8/2007 | Schoener et al. | 345/173 |
| 2007/0236466 A1 | 10/2007 | Hotelling | |
| 2007/0247429 A1 | 10/2007 | Westerman | |

| | | | | | | |
|---|---|---|---|---|---|---|
| 2007/0254411 A1* | 11/2007 | Uhland et al. ............... 438/127 | | 2009/0135145 A1 | 5/2009 | Chen et al. |
| 2007/0257634 A1 | 11/2007 | Leschin et al. | | 2009/0140989 A1 | 6/2009 | Ahlgren |
| 2007/0273561 A1 | 11/2007 | Philipp | | 2009/0167508 A1 | 7/2009 | Fadell et al. |
| 2007/0296702 A1 | 12/2007 | Strawn et al. | | 2009/0167509 A1 | 7/2009 | Fadell et al. |
| 2008/0010593 A1 | 1/2008 | Uusitalo et al. | | 2009/0167677 A1 | 7/2009 | Kruse et al. |
| 2008/0136791 A1 | 6/2008 | Nissar | | 2009/0167704 A1 | 7/2009 | Terlizzi et al. |
| 2008/0143693 A1 | 6/2008 | Schena | | 2009/0174673 A1 | 7/2009 | Ciesla et al. |
| 2008/0150911 A1 | 6/2008 | Harrison | | 2009/0174687 A1 | 7/2009 | Ciesla et al. |
| 2008/0174570 A1* | 7/2008 | Jobs et al. .................... 345/173 | | 2009/0181724 A1 | 7/2009 | Pettersson |
| 2008/0202251 A1* | 8/2008 | Serban et al. .................... 73/780 | | 2009/0182501 A1 | 7/2009 | Fyke et al. |
| 2008/0238448 A1* | 10/2008 | Moore et al. .................. 324/686 | | 2009/0195512 A1 | 8/2009 | Pettersson |
| 2008/0252607 A1* | 10/2008 | De Jong et al. ............... 345/173 | | 2010/0103116 A1 | 4/2010 | Leung et al. |
| 2008/0266264 A1* | 10/2008 | Lipponen et al. ............. 345/169 | | 2010/0103137 A1 | 4/2010 | Ciesla et al. |
| 2008/0286447 A1* | 11/2008 | Alden et al. ................... 427/108 | | 2010/0162109 A1 | 6/2010 | Chatterjee et al. |
| 2008/0291169 A1* | 11/2008 | Brenner et al. ............... 345/168 | | 2010/0295820 A1 | 11/2010 | Kikin-Gil |
| 2008/0297475 A1* | 12/2008 | Woolf et al. .................. 345/163 | | | | |
| 2008/0303796 A1 | 12/2008 | Fyke | | | | |
| 2009/0002140 A1* | 1/2009 | Higa ........................... 340/407.1 | | | | |
| 2009/0002205 A1* | 1/2009 | Klinghult et al. ............... 341/33 | | | | |
| 2009/0002328 A1* | 1/2009 | Ullrich et al. ................. 345/173 | | | | |
| 2009/0009480 A1 | 1/2009 | Heringslack | | | | |
| 2009/0033617 A1 | 2/2009 | Lindberg et al. | | | | |
| 2009/0066672 A1 | 3/2009 | Tanabe et al. | | | | |
| 2009/0085878 A1 | 4/2009 | Heubel et al. | | | | |
| 2009/0106655 A1 | 4/2009 | Grant et al. | | | | |
| 2009/0115733 A1 | 5/2009 | Ma et al. | | | | |
| 2009/0115734 A1 | 5/2009 | Fredriksson et al. | | | | |
| 2009/0128503 A1* | 5/2009 | Grant et al. .................... 345/173 | | | | |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".
U.S. Appl. No. 12/652,704, filed Jan. 5, 2010, Ciesla et al.
U.S. Appl. No. 12/652,708, filed Jan. 5, 2010, Ciesla et al.

* cited by examiner

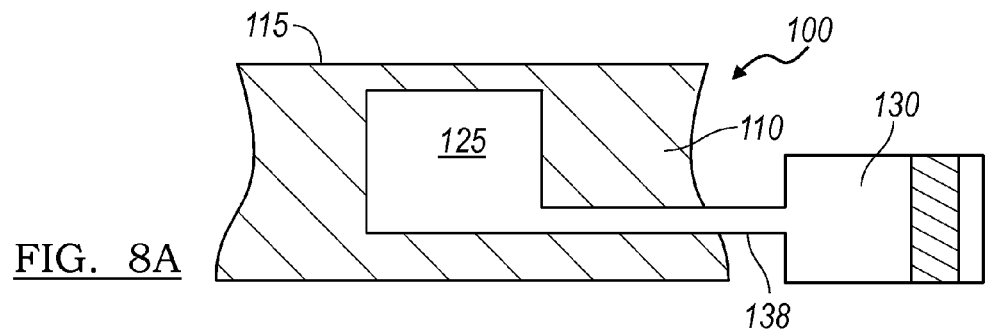
FIG. 8A
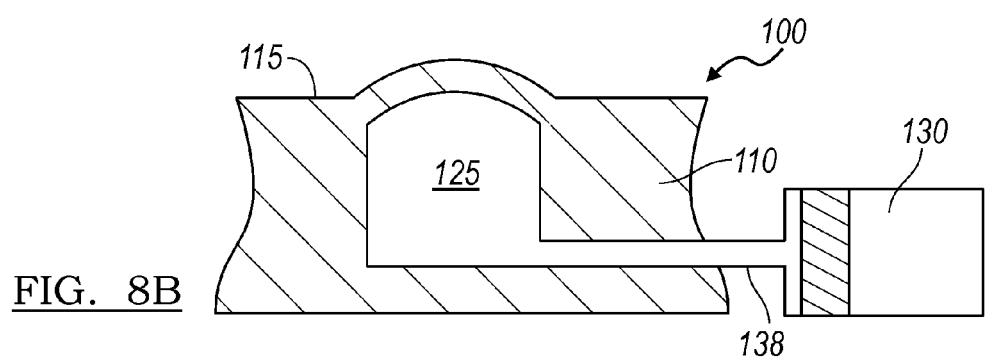
FIG. 8B
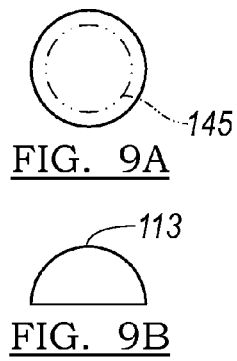
FIG. 9A
FIG. 9B
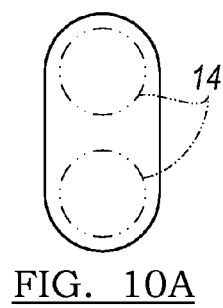
FIG. 10A
FIG. 10B
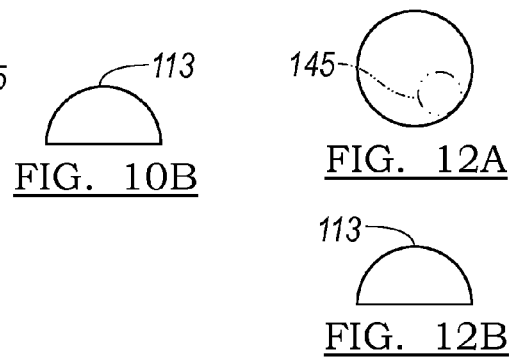
FIG. 12A
FIG. 12B
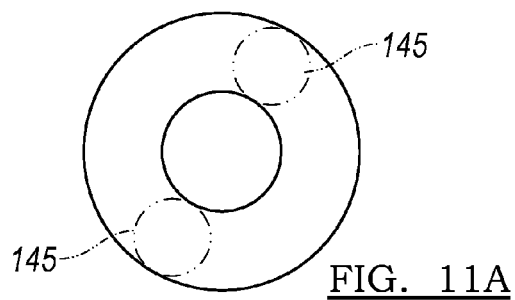
FIG. 11A
FIG. 11B

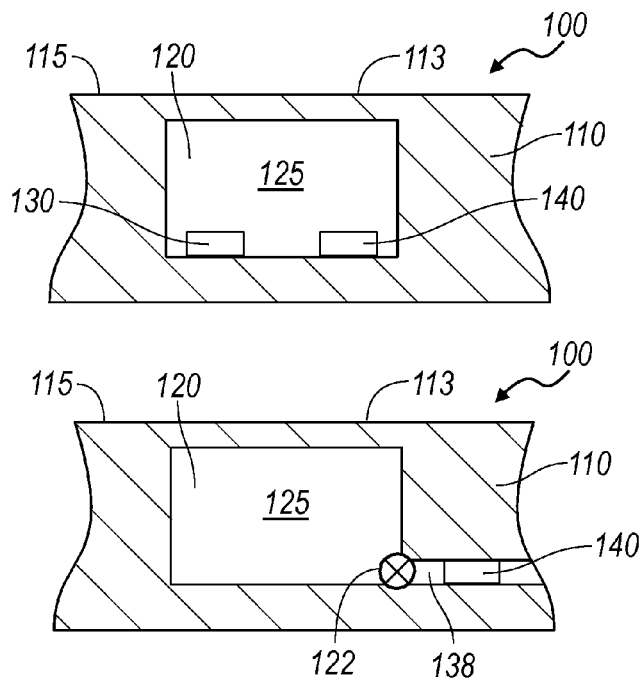
FIG. 19A
FIG. 19B
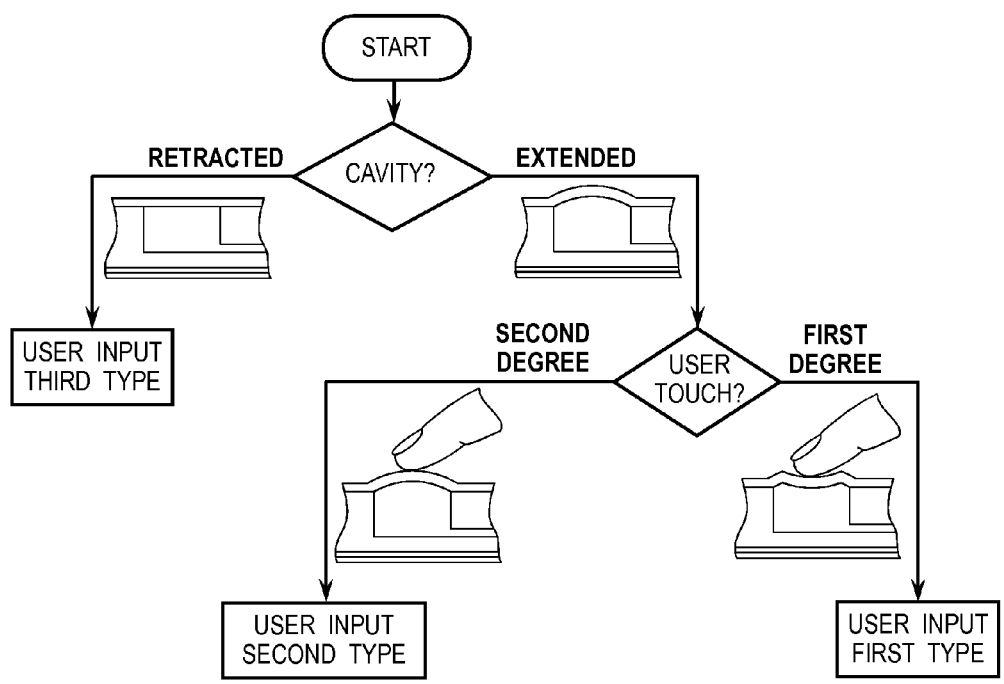
FIG. 20

USER INTERFACE SYSTEM AND METHOD

CROSS-REFERENCE TO RELATED APPLICATIONS

This application is a continuation-in-part of prior application Ser. No. 11/969,848 filed on 4 Jan. 2008 and entitled "System and Method for Raised Touch Screens", and a continuation-in-part of prior application Ser. No. 12/319,334 filed on 5 Jan. 2009 and entitled "User Interface System", which are both incorporated in their entirety by this reference.

BACKGROUND

Static user input interfaces, such as those on a typical television remote control or on a mobile phone, provide users with one user interface that locks the interaction modes available between the device and the user. Devices with a static user input interface that may be used with a variety of applications also become very complicated because the static user input interface must be compatible with each application. In the case of universal remotes, user interaction may become very confusing for the user because of the abundance of buttons available that may either provide dual functionality between devices or are extraneous for any one particular device. In the case of mobile devices, such as a cellular phone with multiple functionalities that uses a static user input interface, adapting the available static user input interface to the plurality of functionalities of the device is also challenging. Additionally, as mobile devices become smaller and more powerful, functionality of the device may be severely hindered by a static user input interface.

Touch sensitive displays, e.g., touch screens, are able to provide a dynamic user input interface and are very useful in applications where the user interface is applied to a variety of uses, for example, in a universal remote where the user interface may change to adapt to the device that is being controlled by the user or in a cellular phone with multiple functionalities. However, unlike a static user input interface with a dedicated input device, such as a keypad with discrete well-defined keys, most touch sensitive displays are generally flat. As a result, touch sensitive displays do not provide any of the tactile guidance that may be seen in static user interfaces.

Hence, serious drawbacks exist in current commonly available user interfaces. In the case of a static user input interface, there is the benefit of tactile guidance but the serious drawback of inability to adapt to an application type. In the case of a touch sensitive display, there is the benefit of an adaptable display and dynamic user input interface but the serious drawback of no tactile guidance, resulting in incorrectly entered keystrokes and the need for the user to keep his or her eyes on the display. The importance of tactile guidance is readily apparent in the competition between the Apple iPhone and the Blackberry 8800. Additionally, with many touch sensitive displays, each touch made by the user is registered with the system, preventing the user from resting his or her finger on the surface of the display. In some touch sensitive displays, the reliance on the change in capacitance due to the presence of a finger at a location as the occurrence of a user input results in the inability for the touch sensitive display to detect user inputs when the user is wearing a glove or when other barriers between a finger and the screen are present.

This invention provides a new and useful user interface that combines many of the advantages of the benefits of a static user input interface and many of the advantages of a dynamic user input interface.

BRIEF DESCRIPTION OF THE FIGURES

FIGS. 8a and 8b are schematic views of the sheet, the cavity, the sensor, and a displacement device of a third example that displaces additional fluid into and out of the cavity, with the cavity in a retracted volume setting and an expanded volume setting, respectively.

FIGS. 9a, 9b, 10a, 10b, 11a, 11b, 12a, and 12b are top and side views of a button deformation, a slider deformation, a slider ring deformation, a guide deformation, and a pointing stick deformation, respectively.

FIGS. 19a and 19b are schematic views of a first and second variation of the sensor as a pressure sensor, respectively.

FIG. 20 is a flow chart of the different operation modes of the preferred embodiments.

FIG. 22 is a top view of the sensor that is a capacitive sensor with an X-conductor and a Y-conductor per cavity.

FIG. 23 is a top view of the sensor that is a capacitive sensor with fewer than an X-conductor and a Y-conductor per cavity.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
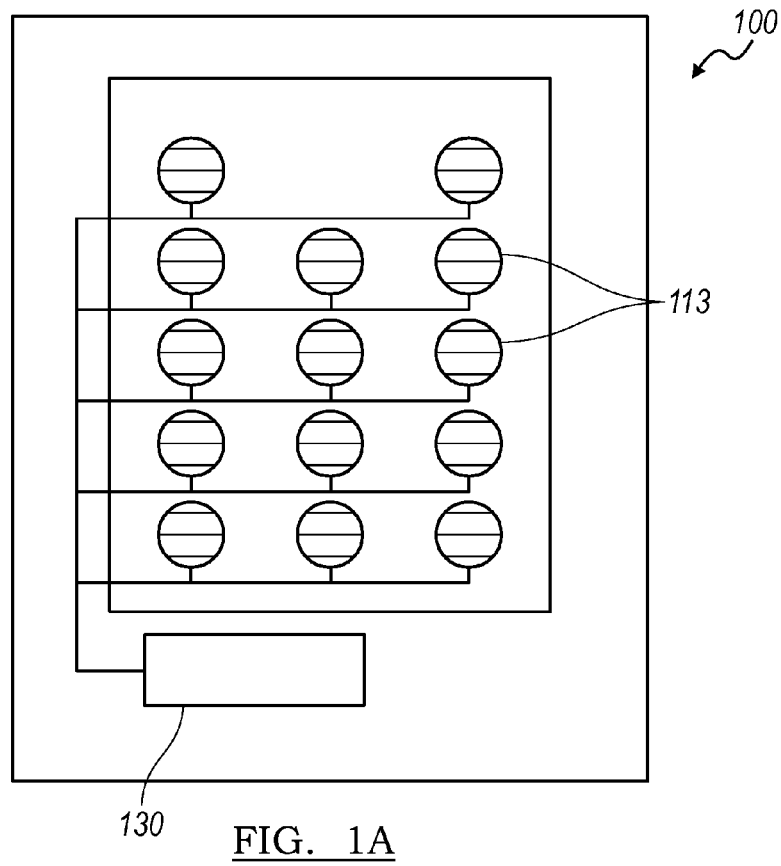
FIGS. 1a and 1b are a top view of the user interface system of a preferred embodiments and a cross-sectional view illustrating the operation of a button array in accordance to the preferred embodiments, respectively.
Figure 1B:
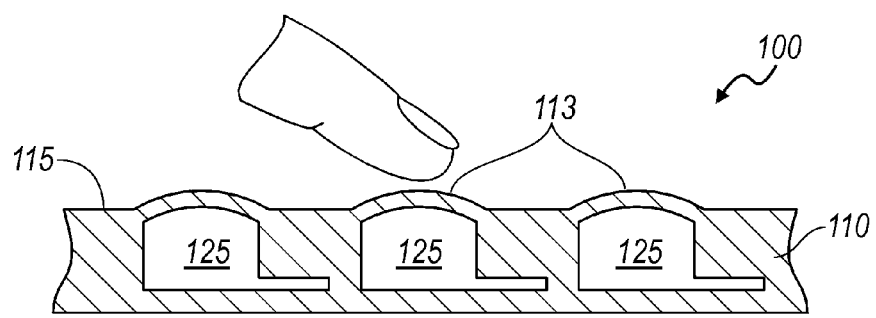
Figure 2A:
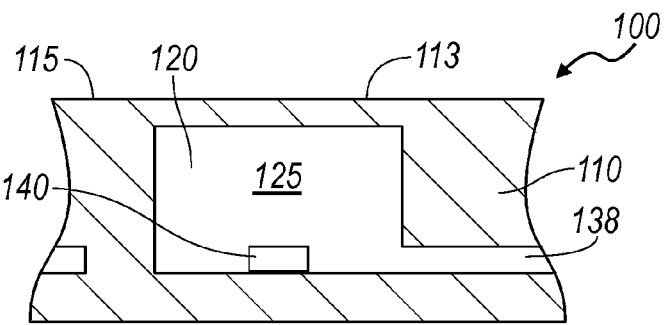
FIGS. 2a, 2b, and 2c are cross-sectional views of the retracted, extended, and user input modes of the preferred embodiments, respectively.
Figure 2B:
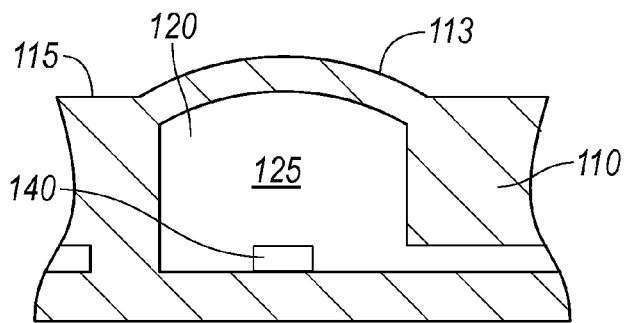
Figure 2C:
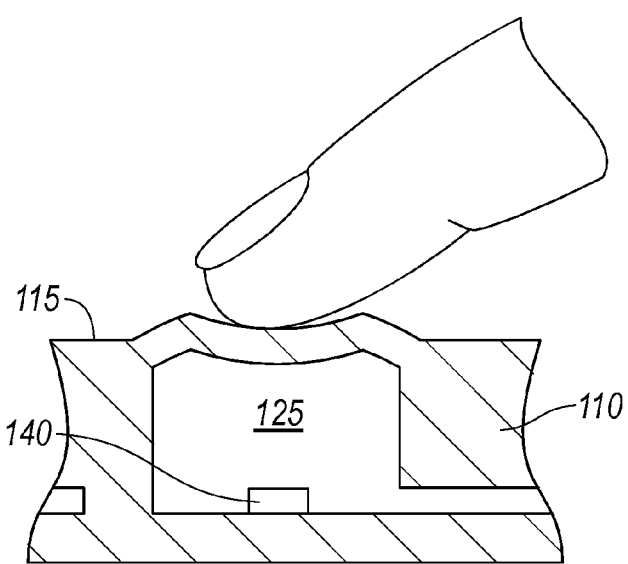
Figure 3:
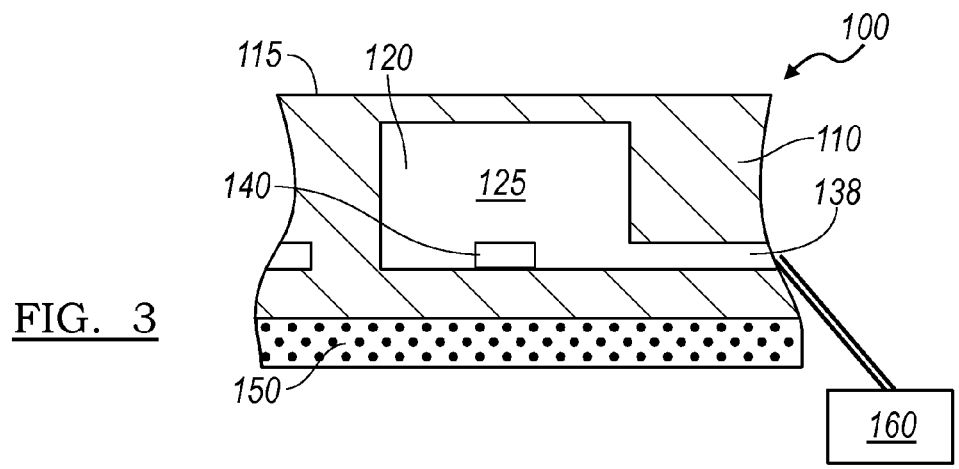
FIG. 3 is a cross-sectional view of the sheet, the cavity, the sensor, and the display of the preferred embodiments with a processor.

As shown in FIGS. 1 and 2, the user interface system 100 of the preferred embodiments includes a sheet 110 that defines a surface 115 and a cavity 125, a volume of a fluid 120 contained within the cavity 125, a displacement device 130 that modifies the volume of the fluid 120 to expand the cavity 125 (thereby outwardly deforming a particular region 113 of the surface 115), and a sensor 140 that detects a force applied by a user that inwardly deforms the particular region 113 of the surface 115. As shown in FIG. 3, the user interface system too may also include a display 150 coupled to the sheet 110 and adapted to output images to the user and a processor 160 that is preferably coupled to the sensor 140 to receive signals from the sensor 140 and coupled to the displacement device 130 to send signals to the displacement device 130. The sensor 140 may also be located in between the sheet 110 and the display 150. However, any other suitable arrangement of the components of the system too may be used.

The user interface system too of the preferred embodiments has been specifically designed to be used as the user interface for an electronic device, more preferably in an electronic device that benefits from an adaptive user interface. The electronic device, which may or may not include a display, may be an automotive console, a desktop computer, a laptop computer, a tablet computer, a television, a radio, a desk phone, a mobile phone, a PDA, a personal navigation device, a personal media player, a camera, a watch, a remote, a mouse, a trackpad, or a keyboard. The user interface system too may, however, be used as the user interface for any suitable device that interfaces with a user in a tactile and/or visual manner. As shown in FIG. 2, the surface 115 of the user interface system too preferably remains flat until a tactile guidance is to be provided at the location of the particular region 113. The surface 115 of the user interface system 100 may also be deformed when a user input is required. At that time, the displacement device 130 expands the cavity 125 to deform and/or expand the particular region 113 outward, preferably forming a button-like shape. With the button-like shape, the user will have tactile guidance when navigating for the expanded particular region 113 and will have tactile feedback when applying force onto the particular region 113 to provide input. The sensor 140 preferably senses the force that inwardly deforms the particular region 113. However, any other arrangement of the user interface system 100 suitable to providing tactile guidance and/or detecting user input may be used.

1. The Sheet

Figure 4:
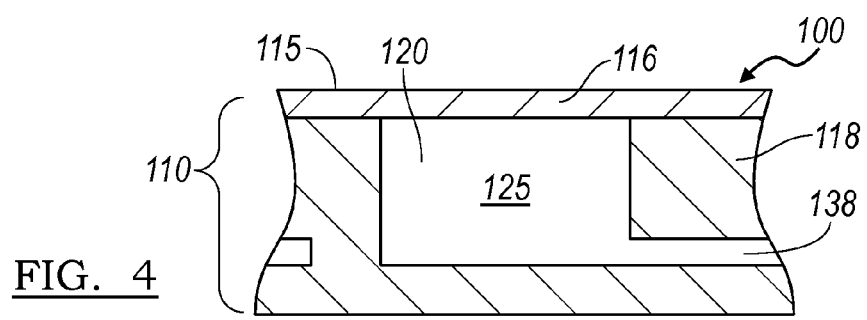
FIG. 4 is a cross-sectional view of the sheet split into a layer portion and a substrate portion.

As shown in FIGS. 1 and 2, the sheet 110 of the preferred embodiment functions to provide the surface 115 that interfaces with a user in a tactile manner and to at least partially define the cavity 125. The surface 115 is preferably continuous, such that when swiping a finger across the surface 115 a user would not feel any interruptions or seams. Alternatively, the surface 115 may include features that facilitate the user in distinguishing one region from another. The surface 115 is also preferably planar. The surface 115 is preferably arranged in a flat plane, but may alternatively be arranged in a curved or warped plane. The surface 115 also functions to deform upon an expansion of the cavity 125, and to preferably "relax" or "un-deform" back to a normal planar state upon retraction of the cavity 125. In one version, the sheet 110 contains a first portion that is elastic and a second portion that is relatively less elastic. In another version, sheet 110 is relatively more elastic in specific areas and relatively less elastic in other areas and is deformed by the expanded cavity 125 in the relatively more elastic areas. In another version, the sheet 110 is generally of the same elasticity. In yet another version, the sheet 110 includes or is made of a smart material, such as Nickel Titanium (commonly referred to as "Nitinol"), that has a selective and/or variable elasticity. The sheet 110 is preferably optically transparent, but may alternatively be translucent or opaque. In addition to the transparency, the sheet 110 preferably has the following properties: a high transmission, a low haze, a wide viewing angle, a minimal amount of back reflectance upon the display (if the display is included with the user interface system too), scratch resistant, chemical resistant, stain resistant, relatively smooth (not tacky) to the touch, no out-gassing, and/or relatively low degradation rate when exposed to ultraviolet light. The sheet 110 is preferably made from a suitable elastic material, including polymers and silicon-based elastomers such as poly-dimethylsiloxane (PDMS) or RTV Silicon (e.g., RTV Silicon 615). In the version wherein the sheet 110 includes a first portion that is elastic and a second portion that is relatively inelastic, the inelastic portion is preferably made from a material including polymers or glass, for example, elastomers, silicon-based organic polymers such as poly-dimethylsiloxane (PDMS), thermoset plastics such as polymethyl methacrylate (PMMA), photocurable solvent resistant elastomers such as perfluropolyethers, polyethylene terephthalate (PET), or any other suitable material. The sheet 110 may, however, be made of any suitable material that provides the surface 115 that deforms and defines a cavity 125. The sheet 110 may be manufactured using well-known techniques for micro-fluid arrays to create one or more cavities and/or micro channels. The sheet 110 may be constructed using multiple layers from the same material or from different suitable materials, for example, the sheet 110 may include a layer portion 116 of one material that defines the surface 115 and a substrate portion 118 of a second material (as shown in FIG. 4). The substrate portion 118 functions to support the layer portion 118 and to at least partially define the cavity 125. However, any other suitable arrangement, material, and manufacturing method may be used to create sheet no.

Figure 24A:
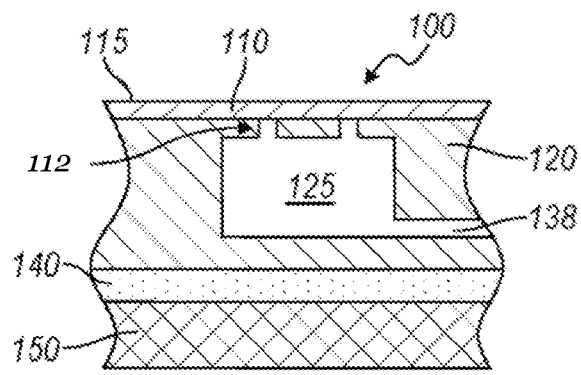
FIGS. 24a and 24b are cross-sectional views of a support member between the layer and the substrate, with the cavity in a retracted volume setting and an expanded volume setting, respectively.
Figure 24C:
FIG. 24c is a top view of the support member.
Figure 24B:
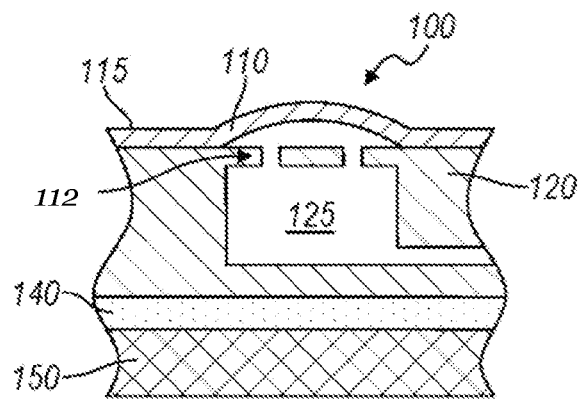
Figure 24D:
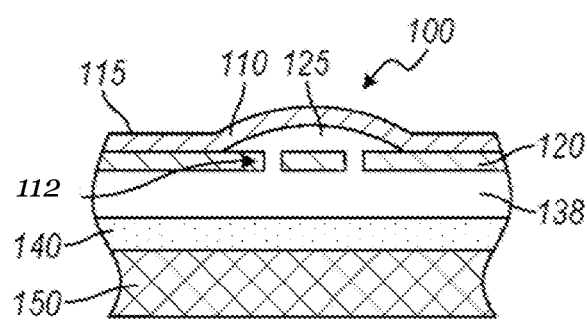
FIG. 24d is a cross-sectional view of an alternative support member that partially defines the cavity.

As shown in FIGS. 24a and 24b, the substrate 120 may include a lattice-like support member 112 under the particular region of the surface 115. When the cavity 125 is expanded and the deformation is present in the surface 115, the support member 112 functions to prevent a user from "pressing too far" into the deformation below the plane of the surface 115. When the cavity 125 is not expanded and the deformation is not present in the surface 115, the support member 112 functions to reduce (or potentially eliminate) the user from feeling "divots" in the surface 115 when swiping a finger across the surface 115. As shown in FIG. 24c, the support member 112 preferably includes holes or channels that allow for the expansion of the cavity 125 and the deformation of the surface 115. The support member 112 is preferably integrally formed with the substrate 124, but may alternatively be formed with the layer 110 or may be separately formed and later attached to the substrate 120. Finally, as shown in FIG. 24d, the support member 112 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1mm to 0.1mm thick and can be manufactured using well-known techniques for micro-fluid arrays to create one or more cavities and/or micro channels. In alternative versions, the substrate 120 may be constructed using multiple layers from the same material or from different suitable materials.

As shown in FIG. 2, the cavity 125 of the preferred embodiment functions to hold a volume of fluid 120 and to have at least two volumetric settings: a retracted volume setting (shown in FIG. 2a) and an extended volume setting (shown in FIG. 2b). The fluid 120 is preferably a substantially incompressible fluid, but may alternatively be a compressible fluid. The fluid 120 is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 deforms the particular region 113 of the surface 115 above the plane of the other regions of the surface 115. When used with a mobile phone device, the cavity 125 preferably has a diameter of 2-10 mm. When used with this or other applications, however, the cavity 125 may have any suitable dimension.

2. The Displacement Device

The displacement device 130 of the preferred embodiment functions to influence the volume of the fluid 120 to expand the cavity 125 from the retracted volume setting to the extended volume setting and, ultimately, deforming a particular region 113 of the surface 115. The displacement device 130 preferably modifies the volume of the fluid 120 by (1) modifying the volume of the existing fluid in the cavity 125, or (2) adding and removing fluid to and from the cavity 125. The displacement device 130 may, however, influence the volume of the fluid 120 by any suitable device or method. Modifying the volume of the existing fluid in the cavity 125 most likely has an advantage of lesser complexity, while adding and removing fluid to and from the cavity 125 most likely has an advantage of maintaining the deformation of the surface 115 without the need for additional energy (if valves or other lockable mechanisms are used). When used with a mobile phone device, the displacement device 130 preferably increases the volume of the fluid 120 within the cavity 125 by approximately 0.003-0.1 ml. When used with this or other applications, however, the volume of the fluid may be increased (or possibly decreased) by any suitable amount.

Figure 5A:
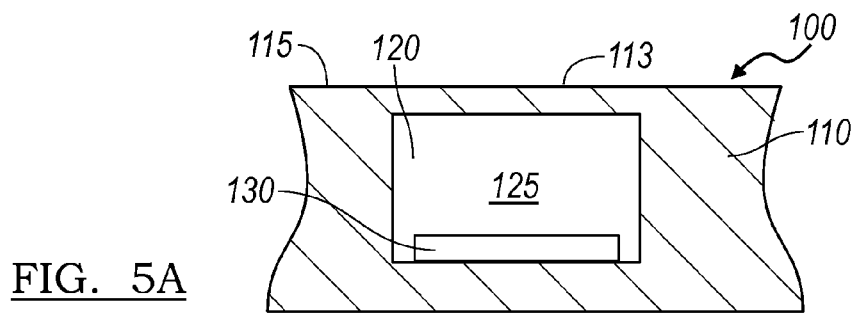
FIGS. 5a and 5b are cross-sectional views of the sheet, the cavity, the sensor, and a displacement device that modifies the existing fluid in the cavity, with the cavity in a retracted volume setting and an expanded volume setting, respectively.
Figure 5B:
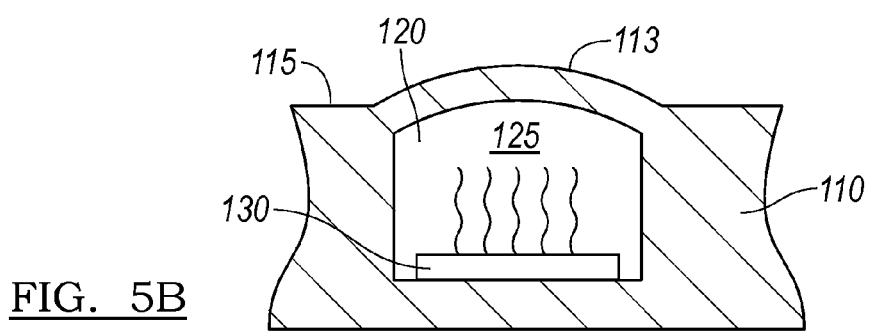

Modifying the existing fluid in the cavity 125 may be accomplished in several ways. In a first example, as shown in FIGS. 5a and 5b, the fluid may be an expandable fluid and the displacement device 130 may include a heating element that heats the expandable fluid, thereby expanding the volume of the existing fluid in the cavity 125 (according to the ideal gas law, PV=nRT). The heating element, which may be located within, adjacent the cavity 125, or any other location suitable to providing heat to the fluid, is preferably a resistive heater (made of a material such as TaN or Nichrome). In a second example, the fluid may include an expandable substance, such as plastic expandable microspheres. In a third example, the fluid may include paraffin. While these are three examples, the displacement device 130 can be any other suitable device or method that ultimately expands the cavity 125 from the retracted volume setting to the extended volume setting by modifying the existing fluid in the cavity 125.

Figure 6:
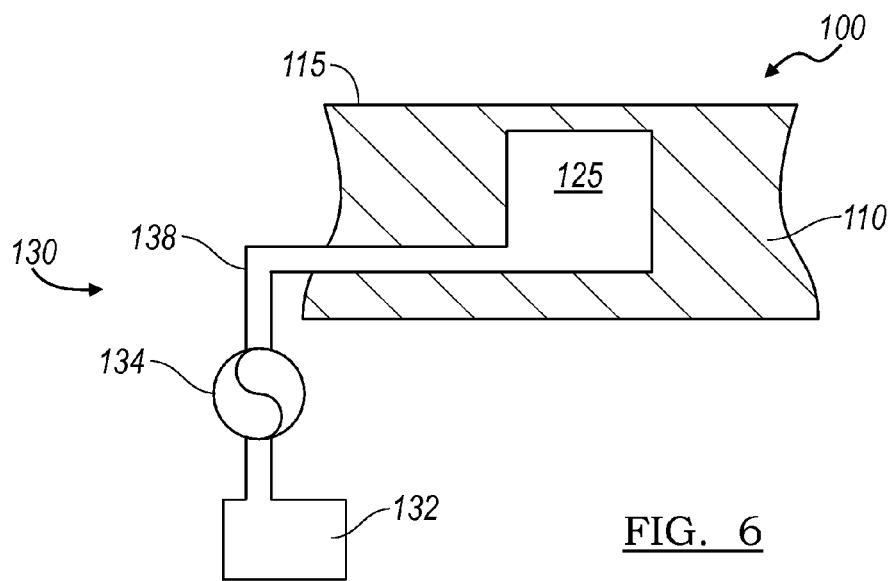
FIG. 6 is a schematic view of the sheet, the cavity, the sensor, and a displacement device of a first example that displaces additional fluid into the cavity.
Figure 7:
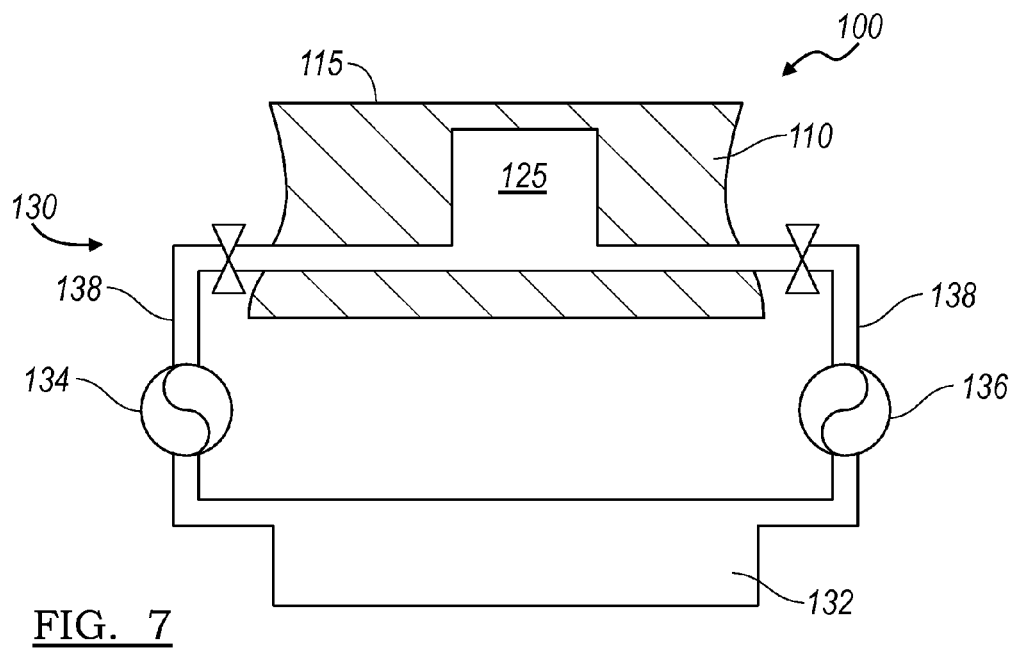
FIG. 7 is a schematic view of the sheet, the cavity, the sensor, and a displacement device of a second example that displaces additional fluid into the cavity.

Adding and removing fluid to and from the cavity 125 may also be accomplished in several ways. In a first example, as shown in FIG. 6, the displacement device 130 includes a reservoir 132 to hold additional fluid and a pump 134 to displace fluid from the reservoir 132 to the cavity 125. The reservoir 132 is preferably remote from the cavity 125 (and connected by a channel 138 or other suitable device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface system 100, the channel 138 may have any suitable dimensions. The pump 134 is preferably a micropump (such as pump #MDP2205 from ThinXXS Microtechnology AG of Zweibrucken, Germany or pump #mp5 from Bartels Mikrotechnik GmbH of Dortmund, Germany), but may be any suitable device to pump fluid from one location to another. The pump 134 is preferably located at a distance from the cavity 125, and is preferably connected to the cavity 125 by a channel 138. To extend the cavity 125 from a retracted volume setting to the extended volume setting, the pump 134 displaces fluid from a reservoir 132, through the channel 138, and into the cavity 125. To retract the cavity 125 from the extended volume setting to the retracted volume setting, the pump 134 preferably "vents" or pumps in a reverse direction from the cavity 125 to the reservoir 132. In a second example, as shown in FIG. 7, the displacement device 130 includes a reservoir 132 to hold additional fluid, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To extend the cavity 125 from the retracted volume setting to the extended volume setting, the first valve is opened, the second valve is closed, and the first pump 134 displaces fluid from the reservoir 132, through the channel 138, and into the cavity 125. To retract the cavity 125 from the extended position to the retracted position, the first valve is closed, the second valve is opened, and the second pump 136 displaces fluid from the cavity 125, through the channel 138, and into the reservoir 132. In other respects, the second example is similar to the first example above. The user interface system 100 may omit the second pump 136 and simply retract the cavity 125 from the extended volume setting to the retracted volume setting by opening the second valve and allowing the cavity 125 to vent or "drain" into the reservoir 132 (potentially assisted by the elasticity of the sheet 110 returning to an un-deformed state). In a third example, as shown in FIGS. 8a and 8b, the displacement device 130 includes an actuator, such as a linear actuator, that displaces fluid into and out of the cavity 125. To extend the cavity 125 from a retracted volume setting to the extended volume setting, as shown in FIG. 8a, the linear actuator displaces fluid through the channel 138 and into the cavity 125. To retract the cavity 125 from the extended volume setting to the retracted volume setting, as shown in FIG. 8b, the linear actuator draws fluid in a reverse direction from the cavity 125 to the reservoir 132. In other respects, the third example is similar to the second example above. While these are three examples, the displacement device 130 can be any other suitable device or method that ultimately expands the cavity 125 from the retracted volume setting to the extended volume setting by adding and removing fluid to and from the cavity 125.

Although the cause of the deformation of a particular region 113 of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the sheet 110 relative to the pressure above the sheet no, is preferably enough to deform a particular region 113 of the surface 115. When used with this or other applications, however, the modification of the pressure may be increased (or possibly decreased) by any suitable amount.

3. The Deformation of the Surface And the Sensor

The deformation of the particular region 113 functions to provide tactile feedback and tactile guidance on the surface 115 for the user. The deformation of the particular region 113 also preferably functions to inform the user of the type of input the deformation represents. For example, the deformation of the particular region 113 may be of a shape that indicates the type of input that the deformation represents. For example, a circular deformation may indicate to the user that they are to select an area along the circular deformation. Alternatively, the sheet 110 may include tactile instructions, for example, a pattern of beads on the particular region 113 that indicate the type of input the deformation represents, for example, a deformation may have a tactile pattern of beads that indicate an arrow, informing the user that the deformation is for a directional input. The tactile instructions on the particular region 113 may alternatively be any other type of feature that is able to be felt tactilely by the user. The sheet 110 of the user interface 100 may also be coupled to a graphic (e.g, a paper insert, a photo, etc.) to indicate to the user the input that is associated with depressing the deformed particular region 113. When used in conjunction with the display 150, the user is preferably shown at least one image that is an image of a visual guide or an input key that is substantially aligned with the particular region 113. The display 150 may also display at least two images, with at least one image substantially aligned with the particular region 113 and functioning to visually differentiate the particular region 113 from the rest of the surface 115 and indicating a visual guide or an input key that the deformed particular region 113 represents. From the user's perspective, the device is asking for a user input through the display 150 and the user interface system 110 is providing tactile guidance and tactile feedback when the user indicates the desired input. The two images may alternatively include a first image and a second image. The first image is displayed and substantially aligned with the particular region 113 and then the second image is displayed and substantially aligned with the particular region 113 when the first image is removed. However, any other arrangement of the user interface system 100 suitable to interfacing with the user may be used.

The deformation preferably acts as (1) a button that, when pressed by the user, signals an input to the sensor 140 (2) a slider that may be pressed at multiple points along the deformation by the user and that signals the location of multiple inputs on the sensor 140, and/or (3) a pointing stick that signals the location of multiple inputs on sensor 140. The deformation may, however, act as any other suitable device or method that signals a user input to the sensor 140. The button, as shown in FIGS. 9a and 9b, preferably has a dome-like shape, but may alternatively have a cylindrical-like shape (with a flat top surface), a pyramid-like shape, a cube-like shape (with a flat top), or any other suitable button shape. The sensor 140 preferably recognizes any user touch 145 into the button as a user input. The slider, as shown in FIGS. 10a, 10b, 11a and 11b, preferably has a ridge like shape (shown in FIGS. 10a and 10b), but may alternatively have a ring like shape (shown in FIGS. 11a and 11b), a plus-like shape, or any other suitable slider shape. The sensor 140 preferably recognizes user touches 145 at different locations into the slider and distinguishes these user touches as different user inputs. As an example, the slider with the ring like shape may act like the "click wheel" of the Apple iPod (second generation). The pointing stick, like the button, preferably has a dome-like shape, as shown in FIGS. 12a and 12b, but may alternatively have a cylindrical-like shape (with a flat top surface), a pyramid-like shape, a cube-like shape (with a flat top), or any other suitable button shape. The sensor 140 preferably recognizes user touches 145 at different locations along the pointing stick and distinguishes these user touches as different user inputs. A depression from the force applied by the user on a portion of the pointing stick is meant to signal a user input in the location of the depression relative to the geometry of the pointing stick. For example, in the variation wherein the pointing stick is a dome-like shape, a depression by the user in the upper right quadrant will be interpreted differently than a depression by the user in the lower right quadrant. Additionally, the user may depress the pointing stick in a sweeping motion, for example, a "sweep" from the upper right quadrant to the lower right quadrant. This may be interpreted as a moving input, similar to that seen in the "click wheel" of the Apple iPod (second generation). In another example, the point stick may act like the pointing stick trademarked by IBM as the TRACKPOINT and by Synaptics as the TOUCH-STYK (which are both informally known as the "nipple").

Figure 13:
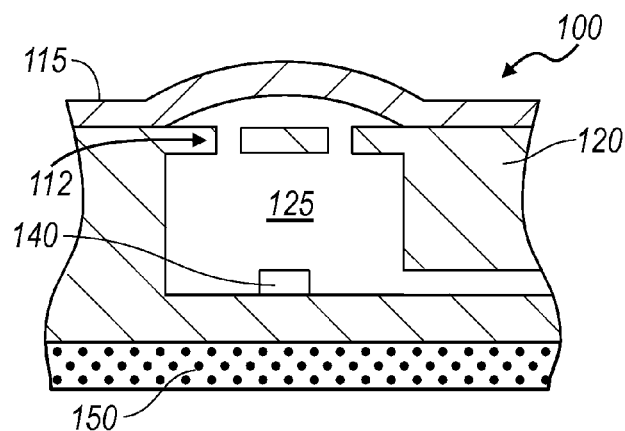
FIG. 13 is a cross-sectional view of a variation of the preferred embodiments with a support structure and a sensor that detects user touch through the support structure.

The sensor 140 may be located within the cavity 125 and/or adjacent to the cavity 125, but may alternatively be located in any other suitable location. In a variation of the sheet 110 and the cavity 125 that includes a support element 112 underneath the surface 115 for the particular region 113 as shown in FIG. 13, a sensor 140 preferably functions to sense a user input through the support element 112 from any location. The sensor 140 preferably detects the presence of a user touch, an inward depression of the expanded particular region 113, and/or any other suitable user input. The sensor may 140 may also function to detect the direction of the user input, the location of the user input, the rate at which the user is inwardly deforming the expanded particular region 113, the level to which the user is inwardly deforming the expanded particular region 113, the type of user input (for example, input by finger or by stylus), and/or any other suitable characteristic of the user input.

Figure 14A:
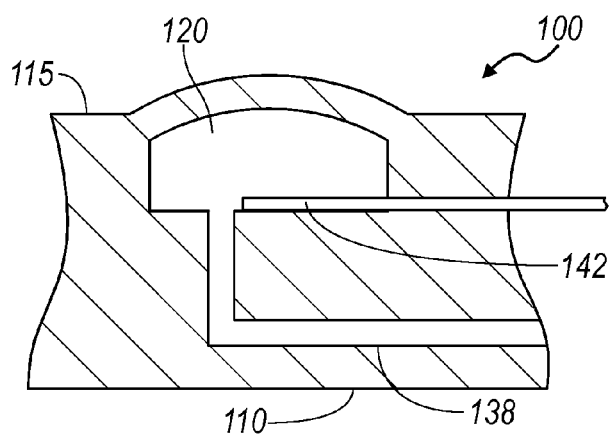
FIGS. 14a, 14b, 14c, and 14d are schematic views of a first, second, third, and fourth example of a first variation of the sensor as a capacitive sensor, respectively.

The sensor 140 is preferably a capacitive sensor that includes at least two conductors that detects a fluctuation in an electric field created by the at least two conductors of the capacitive sensor. The fluctuation may be caused by a user touch, user input through a stylus or any other suitable input assist element, the deformation of the particular region 113, change in fluid position/volume, or any other event that may cause a fluctuation in the electric field that may result in a change in the measured capacitance. The capacitive sensor and is preferably one of several variations. In a first variation, the capacitive sensor includes a first conductor 142 and a second conductor that is a virtual conductor. For example, the virtual conductor may be the virtual ground (such as the shielding ground or the case ground) of the device that the user interface system 100 is appended to, a screen ground for the display 150, or, if the device is a cellular phone, the RF/Signal ground of the device. Fluctuations in the electric field generated between the first conductor 142 and the virtual ground may be used to detect the presence of touch or an input. As shown in FIG. 14, the capacitive sensor is adapted to sense height changes of the fluid 120 within the cavity 125 and/or the presence of a finger on the deformed particular region 113. As shown in FIG. 14a, the first conductor 142 is preferably placed in a location within or adjacent the cavity wherein the inward deformation of the particular region 113 will change the height of the fluid 120 relative to the first conductor 142, thereby influencing the measured capacitance of the capacitive sensor. The first conductor 142 is preferably located on the bottom side of the cavity opposite of the surface 115, allowing the capacitive sensor to sense height changes of the fluid as the particular region 113 is inwardly deformed, but may alternatively be located at the side of the cavity adjacent to the surface 115. When placed adjacent to the surface 115, the first conductor 142 preferably deforms with the particular surface 113 as the user applies force to allow a change in the height of fluid 120 to be sensed. The first conductor 142 may alternatively be placed in any suitable location to allow changes in the height of fluid 120 due to inward deformation of the particular surface 113 to be sensed. The first conductor 142 is preferably made of copper, micro or nanowire, or a transparent conductor such as sputtered indium tin oxide (ITO), but may alternatively be of any type of conductive material wherein the measured capacitance of the conductor is sensitive to height changes of the fluid 120. The capacitive sensor may also function to detect a capacitance change relative to the surface 115 due to the presence of the finger of the user.

Figure 14B:
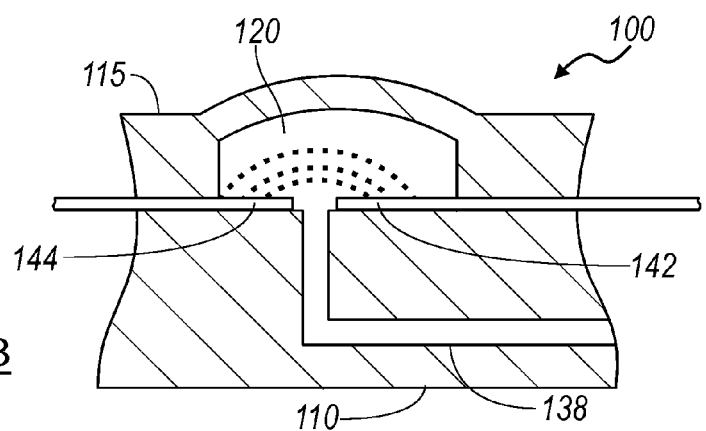

As shown in FIG. 14b, capacitive sensor of the first variation may include a first conductor 142 and a second conductor 144 that is placed within the cavity 125. The second conductor 144 may be used measure the change in capacitance in between the first conductor 142 and the second conductor 144 as the user inwardly deforms the particular region 113. For example, as the user inwardly deforms the particular region 113, the amount of fluid 120 and/or the height of the fluid 120 in between the first conductor 142 and the second conductor 144 may change, causing a change in measured capacitance in between the first conductor 142 and the second conductor 144. The gradient of height difference in between the first conductor 142 and the second conductor 144 may also yield a measurable change in the capacitance in between the first conductor 142 and the second conductor 144. For example, the capacitance reading between the first conductor 142 and the second conductor 144 when the user inwardly deforms the particular region 113 closer to the first conductor 142 may be different from the capacitance reading between the first conductor 142 and the second conductor 144 when the user inwardly deforms the particular region 113 closer to the second conductor 144. This difference may facilitate determining the location of the user input relative to the geometry of the particular region 113. Alternatively, the second conductor 144 may be used to measure height changes of the fluid 120 in the region above the second conductor 144 to work in tandem with the first conductor 142 to provide a more local capacitive measurement of height changes within the cavity 125. Measuring local capacitive changes within the cavity 125 also allows a relative height difference in the fluid 120 to be measured. For example, as the user inwardly deforms the particular region 113, the height of the fluid 120 over the first conductor 142 may be different from the height of the fluid over the second conductor 144, resulting in a difference in the measured capacitance value of the first conductor 142 and the measured capacitance value of the second conductor 144 relative to the surface 115. The capacitance between the first conductor 142 and a first portion of the second conductor 144 may also be compared to the capacitance between the first conductor 142 and a second portion of the second conductor 144 to determine the relative difference in the height of the fluid 120. The relative difference in capacitive values between the two conductors 142 and 144 may facilitate the determination of the location of the user input relative to the geometry of the particular region 113. The first and second portions of the second conductor 144 may be continuous sections along the second conductor 144, but may alternatively be separated by a third portion of a different material from the first and second portions or a break in the second conductor 144. The second conductor 144 may include the first portion and also include a third conductor 146 that contains the second portion. However, any other suitable arrangement and method to determine the occurrence and/or location of a user input through the conductors may be used. The second conductor 144 is preferably identical to the first conductor 142 in material and manufacturing, but may alternatively be made of any material or method suitable to providing a capacitive relationship with the first conductor 142.

Figure 14C:
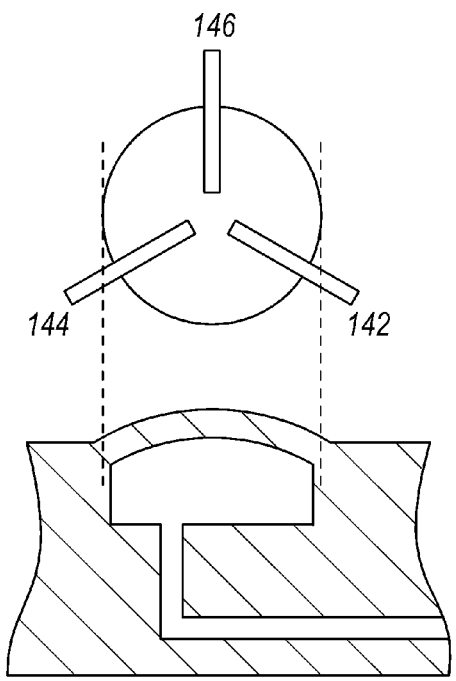
Figure 14D:
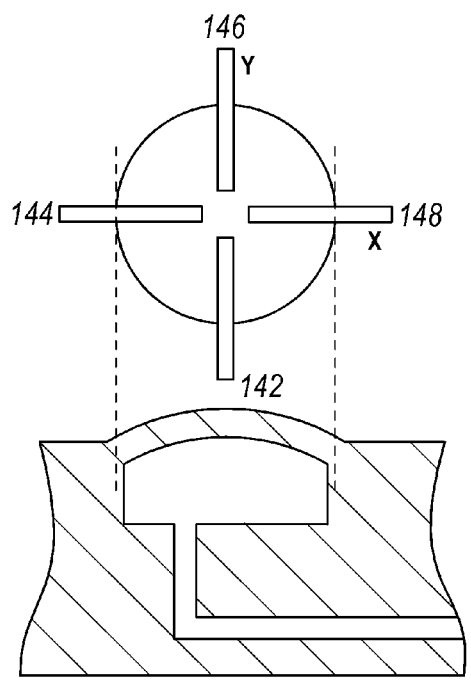
Figure 15A:
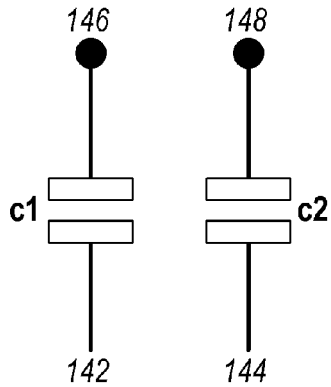
FIGS. 15a and 15b are schematic representations of a first and second method of measuring capacitance of a first variation of the sensor as a capacitive sensor, respectively.
Figure 15B:
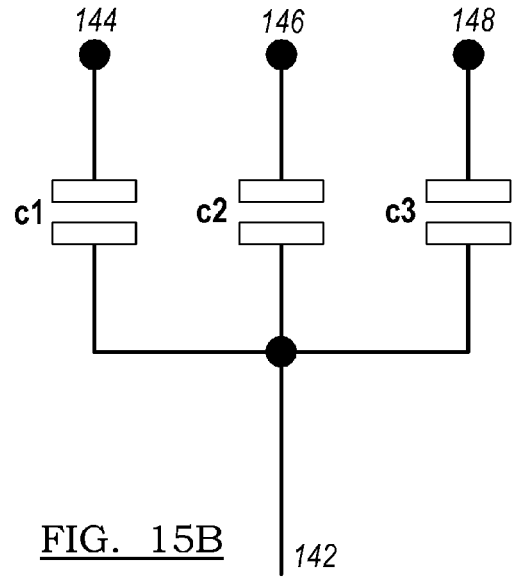

As shown in FIG. 14c and FIG. 14d, the capacitive sensor of the first variation may also include a third conductor 146 and/or a fourth conductor 148. The addition of a third and/or fourth conductor 146 and 148 allows for more accurate determination of the location of user input relative to the geometry of the particular region 113. For example, in the case of four conductors, as shown in FIG. 14d, the particular region 113 may be divided into a four quadrant coordinate system through an X and Y axis with the origin substantially in the center of the particular region 113. In this example, the location of the user input relative to the geometry of the particular region 113 may be measured in a variety of methods. In a first method, as shown in FIG. 15a, the capacitance and/or the relative capacitance between the first conductor 142 and the third conductor 146 may be measured to determine the location of the user input along the X-axis and the capacitance and/or the relative capacitance between the second conductor 144 and the fourth conductor 148 may be measured to determine the location of the user input along the Y-axis. The measured location along the X-axis and the measured location along the Y-axis are then used to determine the location of the user input within the four quadrant coordinate system. In a second method, as shown in FIG. 15b, three capacitance and/or relative capacitance values are measured: between the first conductor 142 and the second conductor 144, between the first conductor 142 and the third conductor 146, and between the first conductor 142 and the fourth conductor 148. The three capacitance values are then preferably used to determine the location of the user input within a four quadrant coordinate system (which can be superimposed over the "tridrant" coordinate system). Similarly, the same methods and/or relationships may be applied to the case of three conductors or any other suitable number of conductors. However, any suitable number of conductors and any other method or relationship between the conductors suitable to determine the location of the user input relative to the geometry of the particular region 113 may be used. The third conductor 146, fourth conductor 148, and/or any other suitable number of conductors are preferably identical to the first conductor 142 in material and manufacturing, but may alternatively made of any material or method suitable to providing a capacitive relationship with the first conductor 142 and/or other conductors.

Figure 16A:
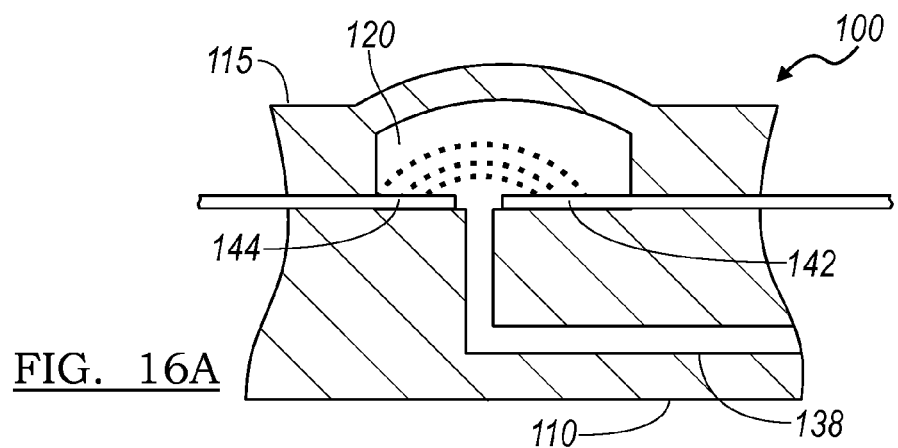
FIGS. 16a, 16b, and 16c are schematic views of a first, second, and third example of the placement of the conductors of the sensor as a capacitive sensor, respectively.
Figure 16B:
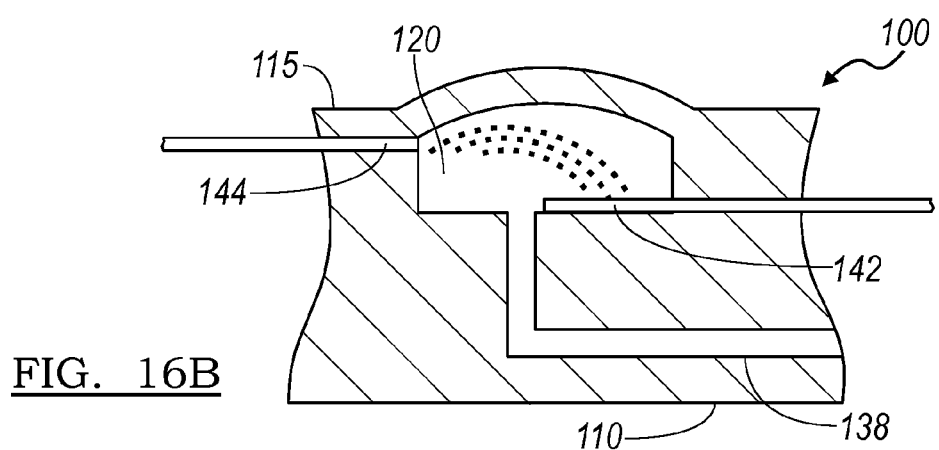
Figure 16C:
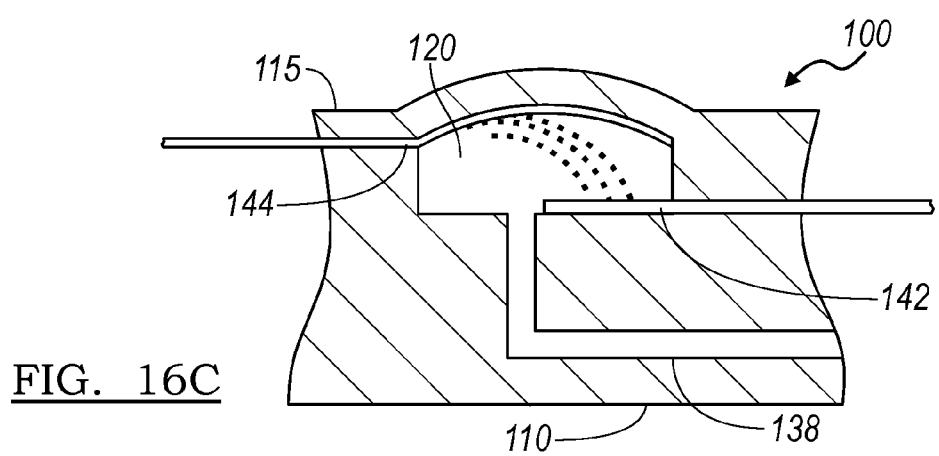

As shown in FIG. 16*a*, the first conductor 142 is preferably placed at a first level relative to the cavity and the second, third, fourth conductors 144, 146, 148, and/or any other suitable number of conductors are placed at the same level relative to the cavity. Alternatively, as shown in FIG. 16*b*, the first conductor 142 may be placed at a first level relative to the cavity and the second conductor 144 may be placed at a second level relative to the cavity. In this variation, the second level is preferably higher than the first level, but may alternatively be lower than the first level. The third, fourth conductors 146, 148 and/or any other suitable number of conductors may also be placed at the second level, but may alternatively be located at a third and/or fourth level relative to the cavity. The difference in location placement relative to the height level within the cavity may facilitate accurate measurement of the location of user input relative to the geometry of the particular region 113. Additionally, in the variation of the sheet 115 wherein the sheet 115 includes a layer portion 116 and a substrate portion 118, the first conductor 142 may be coupled to the substrate portion 118 and the second conductor 144 may be coupled to the layer portion 116, as shown in FIG. 16*c*. However, any other combination of placement of the conductors of the capacitive sensor suitable to determining the location of the user input relative to the geometry of the particular region 113 may be used.

Figure 17A:
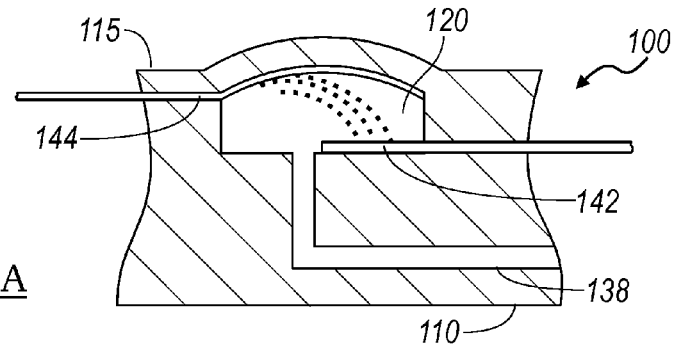
FIGS. 17a and 17b are schematic views of a first and second example of a second variation of the sensor as a capacitive sensor, respectively.
Figure 17B:
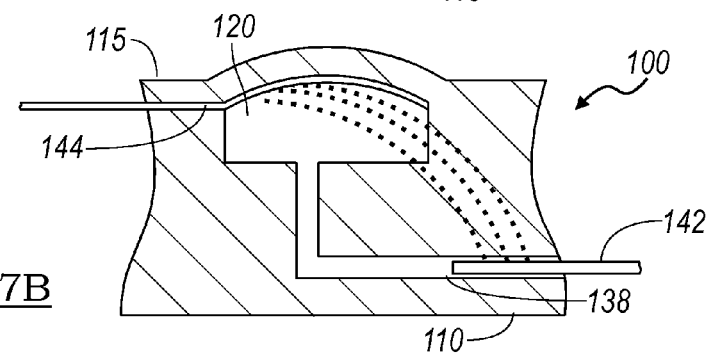

As shown in FIGS. 17*a* and 17*b*, the capacitive sensor of the second variation preferably senses the change in height in between a first conductor 142 and a second conductor 144. In this variation, the first conductor 142 is preferably placed in a location that moves when the user inwardly deforms the particular region 113 and the second conductor 144 is preferably placed in a location that remains relatively stationary when the user inwardly deforms the particular region 113. The second conductor 144 may be placed within the cavity 125, as shown in FIG. 17*a*, but may alternatively be placed in any relatively stationary location within the user interface system 100, as shown in FIG. 17*b*. In this arrangement, a change in the distance between the first and second conductors 142 and 144 will cause the measured capacitance in between the first and second conductors 142 and 144 to change, indicating a user input. The first conductor 142 may also be a flexible conductor such that the inward deformation of the particular region 113 may cause the first conductor 142 to similarly deform. This may allow the location of the user input relative to the geometry of the particular region 113 to be determined. For example, the capacitive sensor may also include a third conductor 146 and/or any suitable number of conductors that may facilitate accurately determining the location of the user input relative to the geometry of the particular region 113. The movement of the first conductor 142 may be detected by measuring the capacitive value between the first conductor 142 and the second conductor 144 and the capacitive value between the first conductor 142 and the third conductor 146. The difference between the two capacitive values may better indicate the location of the user input relative to the geometry of the particular region 113. Alternatively, the capacitance between the first conductor 142 and a first portion of the second conductor 144 may also be compared to the capacitance between the first conductor 142 and a second portion of the second conductor 144 to determine the relative difference in the height of the fluid 120. The relative difference in capacitive values between the two conductors 142 and 144 may facilitate the determination of the location of the user input relative to the geometry of the particular region 113. However, any other suitable arrangement and location of the conductors of the capacitive sensor of the second variation of the sensor 140 suitable to measuring distance differences between conductors due to inward deformation of the particular region 113 by the user may be used. The conductors of the second variation are preferably identical to the first conductor 142 in the first variation in material and manufacturing, but may alternatively made of any material or method suitable to providing a capacitive relationship indicating the distance between conductors.

Figures 18A, 18B, 18C:
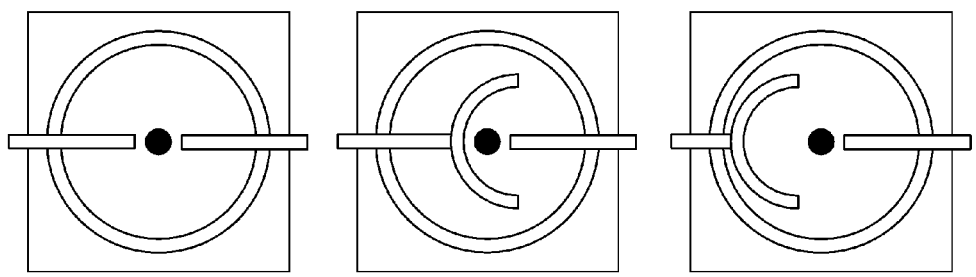
FIGS. 18a-18e are schematic representations of a variety of geometries for the sensor as a capacitive sensor.
Figure 18D:
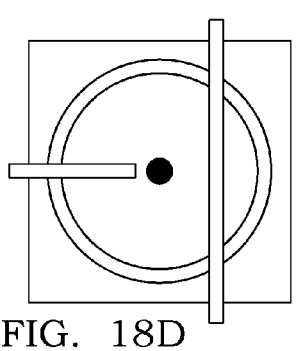
Figure 18E:
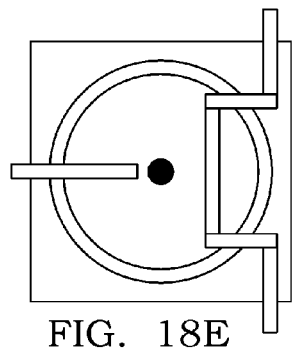

As shown in FIG. 18, the conductors of the capacitive sensor variation of the sensor 140 may be any one of a variety of arrangements and geometries. As mentioned above, both the first and second variations of the capacitive sensor may include at least two conductors (a first conductor and a second conductor). As shown in FIG. 18*a*, the first and second conductors are preferably of the same shape within the cavity 125. Alternatively, as shown in FIGS. 18*b*-18*e*, the first conductor may be of a first geometry and the second conductor may be of a second geometry to increase accuracy in measuring changes in capacitance due to inward deformation of the particular region 113 by the user. For example, the second geometry may follow the geometry of the particular region 113 to facilitate the detection of deformations of the particular region 113, as shown in FIGS. 18*b* and 18*c*. The second conductor may be placed substantially close to the perimeter of the particular region 113, but may alternatively be placed substantially close to the center of the particular region 113. However, the second conductor may be placed in any location suitable to detecting the desired user inputs. Alternatively, as shown in FIGS. 18*d* and 18*e*, the second conductor may be placed perpendicular to the first conductor to allow deformations to be detected both along the axis of the first conductor and along the axis of the second conductor, expanding the region of sensitivity. Additionally, the second conductor may contain more than one portion wherein the capacitance between the first conductor and a first portion of the second conductor is compared to the capacitance between the first conductor and a second portion of the second conductor. However, any suitable arrangement or geometry of the first and second conductors may be used.

The sensor 140 may alternatively be a resistance sensor. Similar to the capacitive sensor, the resistance sensor preferably has at least two conductors and functions to measure the resistance in between the two conductors. In an example, the two conductors may be placed in two different locations within the cavity 125. The resistance between the two conductors may be of a first value in the retracted state and the resistance between the two conductors may be of a second value in the expanded state. When a user provides a force to inwardly deform the deformed particular region 113, the resistance between the two conductors may be of a third value that may be in between the first and the second value. This reading may be used to determine the occurrence of inward deformation of the expanded particular region 113, but may also be used to determine the degree of inward deformation of the expanded particular region 113 caused by the user.

The sensor 140 may alternatively be a pressure sensor, as shown in FIG. 19*a*. In this variation of the sensor 140, the fluid 120 is preferably of a volume that substantially fills the cavity 125 and is also preferably of a substantially incompressible fluid (e.g. water, oil), but may be of any other volume or fluid type wherein inward deformation of the particular region 113 will cause a measurable change in the volume of fluid 120 within the cavity 125. The pressure sensor preferably measures an increase in the pressure within cavity 125 when there is an inward deformation of the particular region 113. The pressure sensor is preferably an absolute pressure sensor, but may also be a differential pressure sensor or any other suitable type of pressure sensor. The pressure sensor may alternatively be a strain gauge mounted within and partially defining the cavity, which deforms when there is an inward deformation of the particular region 113. The pressure sensor of the sensor 140 may, however, be of any suitable type to measure pressure change within the cavity 125 due to inward deformation of the particular region 113.

As shown in FIG. 19b, the sensor 140 may alternatively be a flow sensor. The flow sensor preferably measures backflow of the fluid 120. In this variation, the cavity 125 is preferably coupled to a channel 138. When there is inward deformation of the particular region 113, the overall volume of the cavity 125 will decrease, forcing a volume of the fluid 120 to backflow through the channel 138. The flow sensor preferably detects and/or measures the backflow of the fluid 120 through the channel 138 to determine the occurrence of a deformation of the particular region 113 and/or the magnitude of deformation of the particular region 113. To measure the backflow, the flow sensor is preferably placed in a location in the channel 138 wherein fluid flow is only seen when there is backflow due to the inward deformation of the particular region 113. In one example, the channel 138 may also include a valve 122 that is normally closed to maintain a constant volume of fluid 120 within the cavity. When there is inward deformation of the particular region 113, the valve 122 is opened, allowing backflow to the rest of the channel 138. The flow sensor may be a flow rate sensor that measures the flow rate of the fluid. The volume of fluid 120 that flows through the channel 138 may be calculated from the known cross sectional area of the channel 138 and the flow rate. For demonstration and conciseness, the valve 122 and/or sensor 140 are shown to be located in relatively close proximity to the cavity 125 in FIG. 19b. However, the valve 122 and/or sensor 140 may be placed in any other suitable location relative to the cavity 125 (for example, in a region not pictured in FIG. 19b), that enables contact with fluid flowing through the channel 138. The pressure sensor may alternatively be a Hall effect sensor or any other type of sensor that senses the opening of the valve 122 due to the backflow of the fluid 120. However, the flow sensor may be any other type of fluid sensor that is able to detect and/or measure backflow of the fluid 120.

The sensor 140 may alternatively be a strain sensor. The strain gage sensor preferably measures the strain of the particular region 113 of the surface 115. By knowing the nominal strain of the particular region 113 of the surface 115 in the retracted volume setting and in the extended volume setting, the strain sensor identify when the particular region of the surface has been depressed in the extended volume setting. A plurality of strain sensors may facilitate determining the location of the user input relative to the particular region 113. Multiple strain gauges may be coupled either on, under, or within the surface, and the difference in deformation of one portion of the surface relative to another may help indicate the location of the user input relative to the particular region 113.

Because the capacitive, the resistance, the pressure, the flow, and the strain sensor variations of the sensor 140 may allow the location of a user input or a shift in the location of user input along the deformation of the particular region 113 (e.g., as the user "sweeps" from one location to another) to be detected, the sensor 140 of these variation may be applied to the slide and the pointing stick variations of the deformation of the particular region 113 described above.

The sensor 140 is preferably one of the variations described above, but may be any other sensor suitable to sensing the inward deformation of the particular region 113. The sensor 140 may also be of any suitable combination of the variations described above.

4. The Processor

The user interface system 100 of the preferred embodiment may also include a processor, which is coupled to the displacement device 130 and to the sensor 140. As shown in FIG. 20, the processor 160 functions to operate the user interface system 100 in an Extended Cavity Mode and a Retracted Cavity Mode. In the Extended Cavity Mode when the particular region 113 of the surface is outwardly deformed, then a force of a first degree or magnitude applied by the user onto the deformed particular region of the surface 113 is preferably recognized as a user input of a first type. A force of a second degree or magnitude applied by the user onto the deformed particular region 113 of the surface, wherein the second degree is less than the first degree, is preferably recognized as a user input of a second type. In an example, if the force of the second degree is the result of the user resting his or her finger on the particular region 113, then the processor 160 preferably ignores the user input of the second type. In this manner, the deformation of the particular region 113 additionally functions to distance the user touch from the sensor 140 and to allow the user to rest their fingers on the deformation (the location of an input) without actuating the input. Alternatively, if the force of the second degree is the result of the user lightly applying force to the particular region 113, then the processor 160 may interpret the user input of the second type as an input of a lower magnitude than the user input of the first type. However, any other suitable relationship between the user input of the first type and the second type may be applied. The determination of whether the force applied by the user on the particular region 113 is of the first degree or the second degree may be set or modified by the manufacturer, the processor, and/or the user. In the Retracted Cavity Mode when the particular region 113 of the surface is not outwardly deformed, then a user touch at the particular region in the surface 115 is preferably not recognized as a user input of the first type or the second type, but rather as a user input of a third type that is distinguishable from a user input of the first type and the second type. The user input of the third type may also be ignored. Additionally, in the Extended Cavity Mode, a force applied by the user of a third degree, wherein the third degree is lower than the first degree but higher than the second degree, may be interpreted as a user input of a fourth type. However, any additional degrees of force applied by the user on the particular region 113 may be detected and interpreted as any suitable type of user input.

The processor 160 may also function to detect the rate at which the user applies a force to the particular region 160. In the Extended Cavity Mode when the particular region 113 of the surface is outwardly deformed, then a force applied at a first rate of change onto the deformed particular region of the surface 113 is preferably recognized as a user input of a first type. An applied force of a second rate of change onto the deformed particular region 113 of the surface, wherein the second rate is higher than the first rate, is preferably recognized as a user input of a second type. For example, the inward deformation of the particular region 113 may be interpreted by the processor 160 as an indication of the user to scroll through a webpage. When the user applies a force at the first rate, the processor will scroll through the webpage at a first speed. When the user applies a force at the second rate, then the processor will scroll through the website at a second speed, wherein the second speed is faster than the first speed. In this manner, the sensor 140 and the processor 160 are able to determine a larger range of user inputs from the inward deformation of the particular region 113. However, any other suitable relationship between the user input of the first type and the second type may be applied. The question of whether the force applied by the user on the particular region 113 is of the first rate or the second rate may be set or modified by the manufacturer, by the processor, or by the user. In the Retracted Cavity Mode when the particular region 113 of the surface is not outwardly deformed, then a user touch at the particular region in the surface 115 is preferably not recognized as a user input of the first type or the second type, but rather is recognized as a user input of a third type that is distinguishable from a user input of the first type and the second type. The user input of the third type may also be ignored. Additionally, in the Extended Cavity mode, a force applied by the user of a third rate of change, wherein the third rate is higher than the first rate but lower than the second rate, may be interpreted as a user input of a fourth type. However, any additional rate of change of force applied by the user on the particular region 113 may be detected and interpreted as any suitable type of user input.

The processor 160 may also function to automatically alter the settings of the user interface system 100. In a first example, in extremely low temperatures, it may be impossible for the displacement device 130 to modify the volume of the fluid to expand the cavity 125 and deform the particular region 113. The processor 160 may be coupled to a temperature sensor and may disable the displacement device 130 under such conditions. In a second example, in high altitude conditions (or in an airplane with reduced air pressure), it may be impossible for the displacement device 130 to modify the volume of the fluid to retract the cavity 125. The processor 160 may be coupled to a pressure sensor and may either disable the displacement device 130, or may simply adjust the volume of the fluid that is modified under such conditions.

Figure 21A:
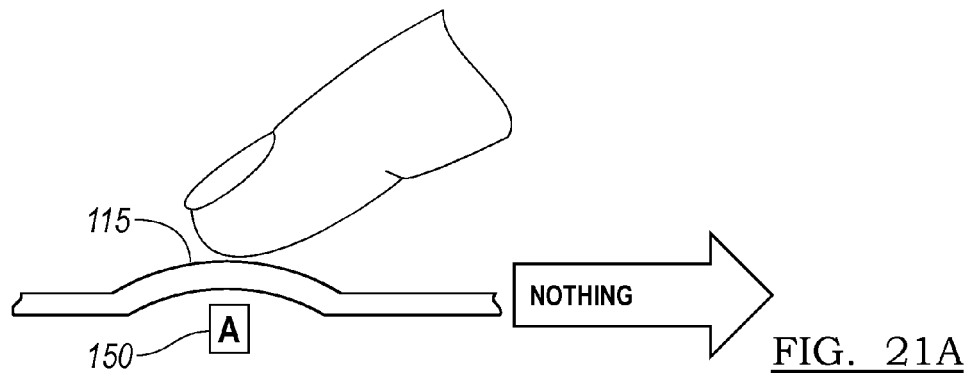
FIGS. 21a-21d is a schematic of the different input graphics, different cavity settings, and different user touches of the preferred embodiments.
Figure 21B:
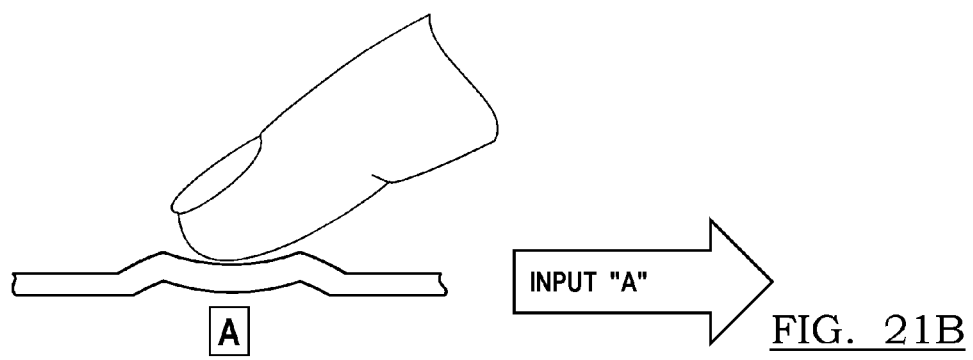
Figure 21C:
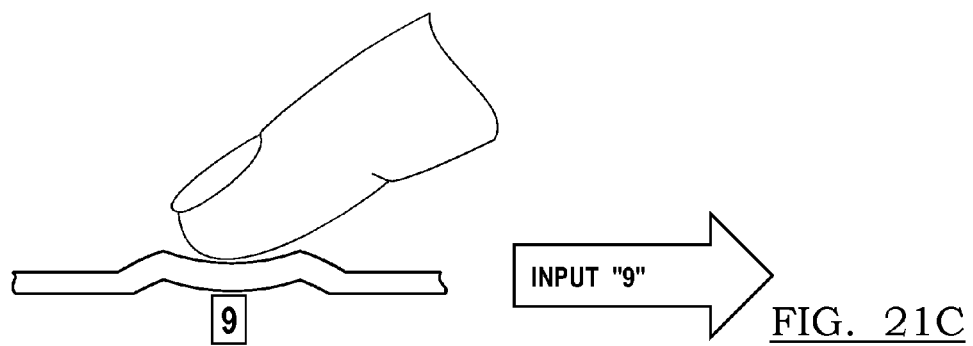
Figure 21D:
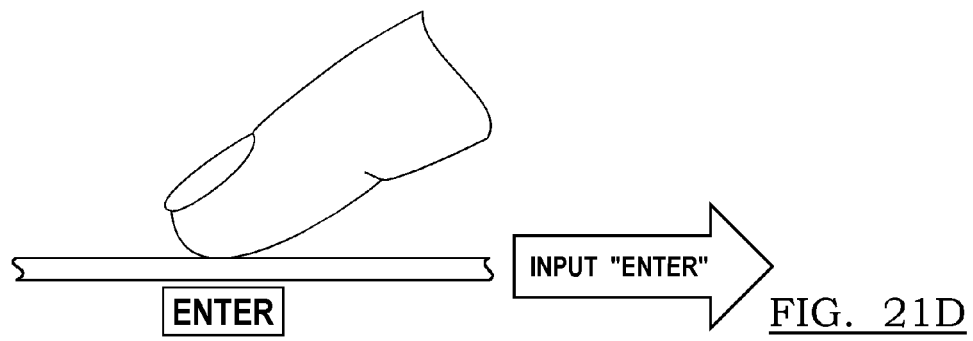

As shown in FIGS. 21a-21d, the processor 160 may also be coupled to the display 150 such that different input graphics may be displayed under the particular region 113, and different inputs may be recognized. As an example, when the cavity 125 is in the Extended Cavity Mode, as shown in FIG. 21a, the display 150 may include an input graphic of a first type (such as a letter) and the user input on the deformation, as shown in FIG. 21b, would be of a first type (such as a letter), and the display 150 may include an input graphic of a second type (such as a number) and the user input on the deformation would be of a second type (such as a number), as shown in FIG. 21c. When the cavity 125 is in the Retracted Cavity Mode, the display 150 may further include an input graphic of a third type (such as an "enter" or "accept" input), and the user input on the sensor 140 would be of a third type (such as an "enter" or "accept" input), as shown in FIG. 21d. The processor 160 may also be coupled to the device upon which the display 150 and the user interface system 100 are used and may function to control processes carried out by the device.

The processor 160 may also function to alter the output of the display 150 to correct or adjust for any optical distortion caused by the deformation of the particular region 113. It is envisioned that, in certain applications, the size of the deformation may cause a "fish eye" effect when viewing the display 150. The processor, preferably through empirical data, may adjust the output to help correct for this distortion.

The processor 160 preferably includes a separate and remote controller for the displacement device 130, a separate and remote controller for the sensor 140, and a separate and remote controller for the display 150. The processor 160 may, however, integrally include a controller for one or more of these elements.

The processor 160 preferably performs one of the functions described above, but may also perform any combination of the functions described above or any other suitable function.

5. Second Cavity

As shown in FIG. 1, the user interface system 100 of the preferred embodiment also includes a second cavity 125. The additional cavities may be substantially identical to the cavity 125, but may also be different in construction, geometry, size, and/or any other suitable feature. Each of the plurality of cavities 125 are preferably able to outwardly deform independently from each other, allowing the user interface system 100 to be adapted to a variety of user input scenarios. Alternatively, the plurality of cavities 125 may be grouped into a plurality of portions, wherein the cavities 125 within one group will outwardly deform together. This may be applied to scenarios wherein a group of cavities 125 are assigned to a particular user input scenario, for example, as a dial pad on a mobile phone or as a QWERTY keyboard. The processor 160 preferably selectively controls the outward deformation of the particular region 113 of each cavity 125. However, any other suitable method of controlling the cavities 125 may be used.

Figure 22:
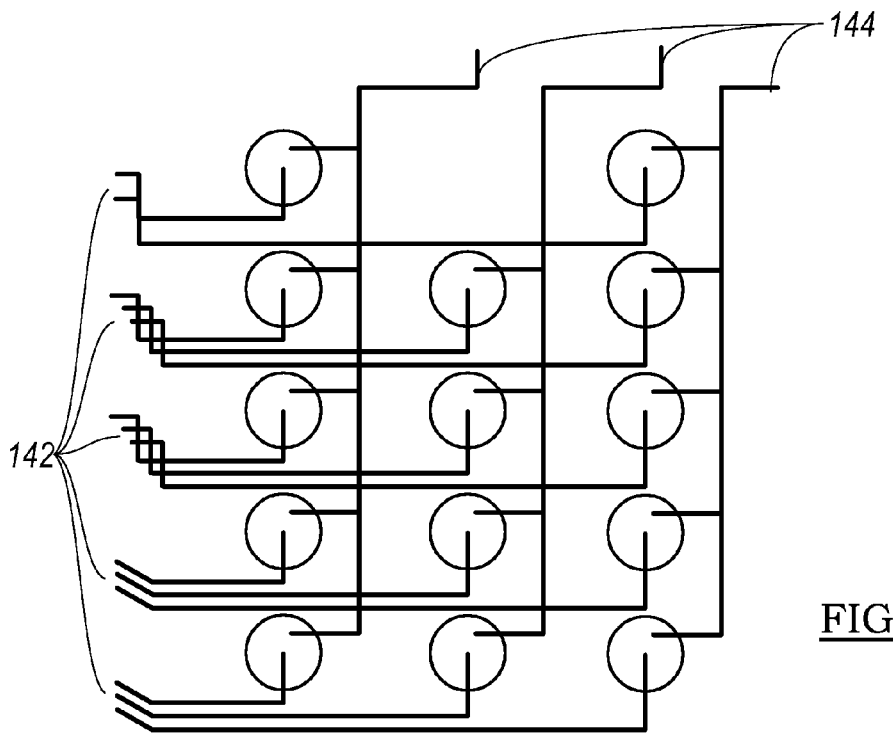
FIGS. 22 and 23 are schematic representations of variations of conductor arrangements in the variation of the user interface system including a second cavity.
Figure 23:
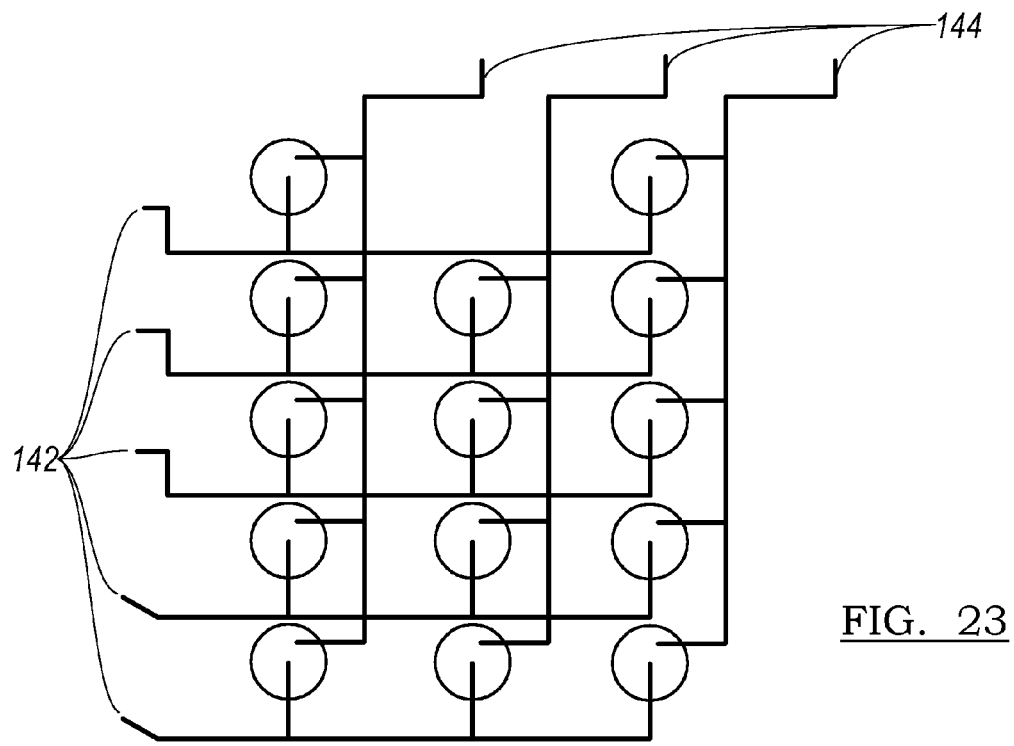

The processor 160 preferably also selectively receives and/or interprets signals representing the presence of a force applied by a user to any cavity 125. The sensor 140 for each cavity 125 is preferably arranged in an array network that preferably communicates the location of each sensor 140 to the processor 160 to allow the processor 160 to selectively receive and/or interpret signals coming from each cavity 125. In the variation of the sensor 140 as a capacitive sensor, as shown in FIGS. 22 and 23, the array includes a first number of X-conductors 142 and a second number of Y-conductors 144. In a first variation, as shown in FIG. 22, the first number of X-conductors 142 is preferably equivalent to the number of cavities 125, wherein each X-first conductor 142 corresponds to one cavity 125, and the second number of Y-conductors 144 is preferably equivalent to the number of columns of cavities 125, wherein each Y-conductor 144 corresponds to all the cavities 125 within one column of cavities 125. In this first variation, the location of a user touch is preferably determined by detecting a change in the measured capacitance value between one X-first conductor 142 and the corresponding Y-conductor 144 for a particular cavity 125. Because each cavity 125 is associated with one X-first conductor 142, the processor 160 is able to detect the location of the cavity 125 over which the user had applied a force. In a second variation, as shown in FIG. 23, the first number of X-conductors 142 is preferably equivalent to the number of rows of cavities 125, wherein each X-first conductor 142 corresponds to all the cavities 125 within one row of cavities 125, and the second number of Y-conductors 144 is preferably equivalent to the number of columns of cavities 113, wherein each Y-conductor 144 corresponds to all the cavities 113 within one column of cavities 144. In this second variation, the location of a user touch is preferably determined by detecting a change in the measured capacitance value between one X-first conductor 142 and one Y-conductor 144. Because each cavity 125 corresponds to a different intersection of the X-conductors 142 and the Y-conductors 144, the processor 160 is able to detect the location of the cavity 125 over which the user had applied force. In a third variation, the first number of X-conductors 142 and the second number of Y-conductors 144 are both preferably equivalent to the number of cavities 125, one X-first conductor 142 and one Y-conductor 144 correspond to one cavity 125. In this third variation, the location of a user touch is preferably determined by detecting a change in the measured capacitance value between one X-first conductor 142 and one Y-conductor 144. Because each cavity 125 corresponds to a different pair of the X-conductors 142 and the Y-conductors 144, the processor 160 is able to detect the location of the cavity 125 over which the user had applied force.

Alternatively, the array network of sensors 140 may include a plurality of sensors 140, each coupled to a cavity 125, that each output a signal specific to the cavity 125. For example, in the capacitive sensor variation of the sensor 140, the sensor 140 for a first cavity 125 may send a signal of 0.5 nF when a user input is detected and a signal of 1 nF when no user input is detected, the sensor 140 for a second cavity 125 may send a signal of 5 nF when a user input is detected and a signal of 10 nF when no user input is detected, the sensor 140 for a third cavity 125 may send a signal of 50 nF when a user input is detected and a signal of 100 nF when no user input is detected, and the sensor 140 for a fourth cavity 125 may send a signal of 500 nF when a user input is detected and a signal of 1000 nF when no user input is detected. Because each cavity 125 sends a different signal, the processor 160 is able to detect the location of the user input based upon the type and/or value of the signal that is received from the sensors 140. The plurality of sensors 140 for the cavities 125 may also be arranged in a parallel relationship (such that the overall capacitive value for a plurality of capacitors in parallel equate to the sum of the individual capacitive values) to facilitate the processor 160 in sensing the location of the user input. For example, using the aforementioned example values for the signals from the sensors 140 of a first, second, third, and fourth cavities 140, the processor 160 may receive a combined signal of 555.5 nF from the sensors 140 when a user input is detected from all of the first, second, third, and fourth cavities 125 and a signal of 1111 nF from the sensors 140 when no user input is detected from any of the first, second, third, and fourth cavities 125. When a user input is detected from the third cavity 125 and not from the first, second, and fourth cavities 125, then the combined signal to the processor 160 may be 1061 nF. Similarly, when a user input is detected from both the second and third cavities 125, then the combined signal to the processor 160 may be 1056 nF. The processor 160 is then able to interpret the locations of the user input directly from the value of the signal that is received from a plurality of sensors 140 of the cavities 125, simplifying electrical routing, mechanical components, and programming in the user interface system 100. The sensors 140 may also be arranged in series or in any other suitable electrical arrangement.

The array arrangements described above also provide the advantage of utilizing multiple sensors 140 to more accurately locate the presence of a user input. User input onto a first expanded particular region 113 may affect the sensor 140 readings for a second expanded particular region 113. By collectively analyzing readings from multiple sensors 140, the particular region 113 upon which the user provides an input may be more accurately determined. For example, in the variation wherein the sensor 140 is a pressure sensor, the pressure sensed by other sensors 140 within the system may be increased when a user provides input at a first particular region 113. By sensing the increase of pressure sensed by sensors 140 adjacent to a particular region 113, the location of the user input may be more accurately determined. Additionally, the array arrangements described above allows for multiple inputs provided at a single time to be detected by the system.

The sensors 140 are preferably located within the cavities 125, but may alternatively be located adjacent to the cavities 125 or both within and adjacent to the cavities 125. By placing sensors 140 both within and adjacent to the cavities 125, user inputs provided to locations other than the particular regions 113 may also be detected, expanding the range of input types and query types for the device. Sensors 140 placed adjacent to the cavities 125 may also be used to more accurately locate the particular region 113 upon which the user provided the input.

The sensor 140, cavity 140, and second cavity 140 may are preferably in arranged in one of the variations described above, but may also be any combination of the variations described above. However, any other suitable arrangement or method of controlling the cavities 125 may be used.

6. Power Source

The user interface system 100 of the preferred embodiments may also include either a power source or a power harnessing device, which both function to power the displacement device 130 (and possibly other elements of the user interface system, such as the sensor 140 and/or the display 150). The power source is preferably a conventional battery, but may be any suitable device or method that provides power to the displacement device 130. The power-harnessing device, which is preferably integrated into the hinge of a flip phone or laptop, functions to harness a portion of the energy involved in the normal use of the electronic device (such as the physical energy provided by the user in the opening of a flip phone or the screen on a laptop). The power-harnessing device may alternatively be integrated in a separate mechanical input device (such as a button on the side of a mobile phone, or a "self-winding" device found in automatic watches) or any other suitable device or method to harness a portion of the energy involved in the normal use of the electronic device.

As a person skilled in the art will recognize from the previous detailed description and from the figures and claims, modifications and changes can be made to the preferred embodiments of the invention without departing from the scope of this invention defined in the following claims.

We claim:
1. A user interface system comprising:
   a volume of fluid;
   a tactile layer defining an outer tactile surface touchable by a user, defining a back surface opposite the outer tactile surface, and including a first region and a second region, wherein the second region is of an elastic material and is operable between:
      a retracted state, wherein the second region is flush with the first region; and
      an expanded state, wherein the second region is proud of the first region;
   a substrate joined to a portion of the back surface of the first region and retaining the first region in planar form;
   wherein the substrate defines a support surface that is adjacent to the second region, is disconnected from the second region, is in contact with the second region in the retracted state, and prevents deformation of the second region inward past the plane of the first region due to a force applied to the outer tactile surface by the user;
   wherein the substrate defines a fluid conduit that communicates a portion of the fluid, through a portion of the substrate, to the back surface of the second region;
   a displacement device configured to manipulate a portion of the fluid, through the fluid conduit, toward the back surface of the second region to transition the second region from the retracted state to the expanded state; and a sensor configured to detect a deformation of the second region, in the expanded state, due to a force applied to the outer tactile surface by the user.

2. The user interface system of claim 1, wherein the substrate further defines a cavity arranged proximal to the support surface and opposite the tactile layer, the cavity communicating fluid between the fluid conduit and the displacement device.

3. The user interface system of claim 2, wherein a portion of the sensor is arranged within the cavity.

4. The user interface system of claim 2, wherein the sensor is a pressure sensor configured to sense fluid pressure changes within the cavity.

5. The user interface system of claim 2, wherein the sensor is a capacitive sensor comprising a first conductor, arranged within the cavity, and a second conductor, coupled to the back surface proximal to the second region.

6. The user interface system of claim 5, wherein at least one of the first conductor and the second conductor extends substantially proximal to the center of the cavity.

7. The user interface system of claim 5, wherein at least one of the first conductor and the second conductor is arranged about a perimeter of the cavity.

8. The user interface system of claim 1, wherein the tactile layer further defines a third region operable between a retracted state and an expanded state, wherein the substrate further defines a second support surface adjacent to the third region and a second fluid conduit that communicates a portion of the fluid to the back surface of the third region, and wherein the displacement device is further configured to manipulate a portion of the fluid, through the second fluid conduit, toward the back surface of the third region to transition the third region from the retracted state to the expanded state.

9. The user interface system of claim 8, wherein the displacement device is configured to manipulate a portion of the fluid to transition the second region, from the retracted state to the expanded state, independently of the third region.

10. The user interface system of claim 8, wherein the substrate further defines a second cavity arranged proximal to the support surface and opposite the tactile layer, the cavity substantially filled with a portion of the fluid and communicating fluid between the second fluid conduit and the displacement device.

11. The user interface system of claim 8, wherein the sensor is configured to detect a deformation of the third region, in the expanded state, due to a force applied to the outer tactile surface by the user, independently of a deformation of the second region.

12. The user interface system of claim 11, further comprising a processor configured to selectively interpret sensor signals pertaining to the second region and the third region.

13. The user interface system of claim 8, further comprising a second sensor configured to detect a deformation of the third region, in the expanded state, due to a force applied to the outer tactile surface by the user, and further comprising a processor configured to selectively interpret signals from the sensor and the second sensor.

14. The user interface system of claim 1, wherein fluid pressure is communication between a portion of the sensor and the fluid conduit.

15. The user interface system of claim 1, wherein the sensor is a capacitive sensor that includes a first conductor and a second conductor.

16. The user interface system of claim 15, wherein the sensor is configured to generate an electromagnetic field and to detect changes in the electromagnetic field due to the presence of an object proximal to the outer tactile surface.

17. The user interface system of claim 16, wherein the sensor is configured to generate an electromagnetic field and to detect changes in the electromagnetic field due to the presence of an object proximal to the outer tactile surface, wherein the object is selected from the group consisting of: a palm of the user; a finger of the user; and a stylus.

18. The user interface system of claim 15, wherein the second conductor is a virtual ground.

19. The user interface system of claim 15, wherein the first conductor and the second conductor are coupled to the tactile layer, the sensor configured to detect the distance between the first conductor and the second conductor.

20. The user interface system of claim 15, wherein the first conductor is perpendicular to the second conductor.

21. The user interface system of claim 1, further comprising a processor, coupled to the sensor, configured to interpret a deformation of the expanded second region as a force applied to the top surface of the layer.

22. The user interface system of claim 21, wherein the processor is configured to ascertain the magnitude of the detected force, compare the magnitude to a threshold, determine a first user input if the magnitude is less than the threshold, and determine a second user input if the magnitude is greater than the threshold.

23. The user interface system of claim 21, wherein the processor is configured to determine a change rate of the detected force, compare the change rate of the detected force to a threshold, determine a first user input if the change rate is less than the threshold, and determine a second user input if the change rate is greater than the threshold.

24. The user interface system of claim 1, wherein tactile layer defines a plurality of second regions, and wherein the sensor includes an array of sensors, each sensor corresponding to one second region.

25. The user interface system of claim 24, wherein the array of sensors includes first number of first conductors and a second number of second conductors, wherein the first number is equivalent to the number of second regions and the second number is less than the number of second regions, and wherein each first conductor corresponds to one second region and each second conductor corresponds to a plurality of second regions.

26. The user interface system of claim 24, wherein the array of sensors includes a first number of first conductors and a second number of second conductors, wherein the first number and the second number are both less than the number of second regions, and wherein each first conductor and each second conductor correspond to a plurality of second regions.

27. The user interface system of claim 24, wherein each sensor in the array of sensors generates a distinct signal for each second region.

28. The user interface system of claim 24, wherein the sensors in the array of sensors are linked and generate a composite sensor signal that indicates the states of a plurality of second regions.

29. The user interface system of claim 1, further comprising a display configured to visually output an image of an input key substantially aligned with the second region.

30. The user interface system of claim 29, wherein the display is configured to visually output a second image substantially aligned with the second region, wherein the display outputs the first image when the second region is in the retracted state and outputs the second image when the second region is in the expanded state.

31. The user interface system of claim 29, wherein the display is coupled to the substrate opposite the tactile layer and the sensor is arranged between the display and the tactile layer, the sensor comprising a material that is substantially transparent.

32. The user interface system of claim 1, wherein the first and second regions are adjacent and the tactile layer defines a substantially continuous outer tactile surface across the first and second regions.

33. The user interface system of claim 1, further comprising a reservoir, coupled to the displacement device.

34. The user interface system of claim 1, wherein the substrate further defines a fluid channel that fluidly couples the displacement device to the fluid conduit.

35. The user interface system of claim 34, wherein the fluid channel is a micro-fluidic channel.

36. The user interface system of claim 34, wherein the substrate defines at least one bore between the fluid channel and the back surface of the second region, the at least one bore defining the fluid conduit.

37. The user interface system of claim 1, wherein the substrate includes a lattice structure adjacent to the second region of the layer, the opens of the lattice structure defining the fluid conduit.

38. A user interface system comprising:
a volume of fluid;
a tactile layer defining an outer tactile surface touchable by a user, defining a back surface opposite the outer tactile surface, and including a first region and a second region, wherein the second region is of an elastic material and is operable between:
  a retracted state, wherein the second region is flush with the first region; and
  an expanded state, wherein the second region is proud of the first region;
a substrate coupled to a portion of the back surface of the first region and retaining the first region in planar form;
wherein the substrate defines a support surface that is adjacent to the second region, is disconnected from the second region, is in contact with the second region in the retracted state, and prevents deformation of the second region inward past the plane of the first region due to a force applied to the outer tactile surface by the user;
wherein the substrate defines a fluid conduit that communicates a portion of the fluid, through a portion of the substrate, to the back surface of the second region; and
a displacement device configured to manipulate a portion of the fluid, through the fluid conduit, toward the back surface of the second region to transition the second region from the retracted state to the expanded state;
a display coupled to the substrate and configured to visually output an image of an input key substantially aligned with the second region, wherein the image is transmitted through the tactile layer to the user;
a sensor configured to generate a signal corresponding to a deformation of the second region, in the expanded state, due to a force applied to the outer tactile surface by the user; and
a processor coupled to the sensor and configured to associate the force with either of a first user input and a second user input based upon a comparison of the signal to a threshold value.

39. The user interface system of claim 38, wherein the processor is configured to ascertain the magnitude of the force applied to the outer tactile surface, compare the magnitude of the force to a threshold magnitude, determine a first user input if the magnitude is less than the threshold magnitude, and determine a second user input if the magnitude is greater than the threshold magnitude.

40. The user interface system of claim 38, wherein the processor is configured to determine a change rate of the force applied to the outer tactile surface, compare the change rate of the force to a threshold change rate, determine a first user input if the change rate is less than the threshold change rate; and determine a second user input if the change rate is greater than the threshold change rate.

41. The user interface system of claim 38, wherein the substrate further defines a cavity arranged proximal to the support surface and opposite the tactile layer, the cavity substantially filled with a portion of the fluid and communicating fluid between the fluid conduit and the displacement device.

42. The user interface system of claim 41, wherein the sensor is a pressure sensor configured to sense fluid pressure changes within the cavity.

43. The user interface system of claim 41, wherein the sensor is a capacitive sensor comprising a first conductor, arranged within the cavity, and a second conductor, coupled to the back surface proximal to the second region.

44. An electronic system comprising:
an electronic device selected from the group consisting of an automotive console, a desktop computer, a laptop computer, a tablet computer, a television, a radio, a desk phone, a mobile phone, a PDA, a personal navigation device, a personal media player, a camera, and a watch;
a user interface system, for the electronic device, including
  a volume of fluid;
  a tactile layer defining an outer tactile surface touchable by a user, defining a back surface opposite the outer tactile surface, and including a first region and a second region, wherein the second region is of an elastic material and is operable between:
    a retracted state, wherein the second region is flush with the first region; and
    an expanded state, wherein the second region is proud of the first region;
  a substrate joined to a portion of the back surface of the first region and retaining the first region in planar form;
  wherein the substrate defines a support surface that is adjacent to the second region, is disconnected from the second region, is in contact with the second region in the retracted state, and prevents deformation of the second region inward past the plane of the first region due to a force applied to the outer tactile surface by the user;
  wherein the substrate defines a fluid conduit that communicates a portion of the fluid, through a portion of the substrate, to the back surface of the second region;
  a displacement device configured to manipulate a portion of the fluid, through the fluid conduit, toward the back surface of the second region to transition the second region from the retracted state to the expanded state; and
  a sensor configured to detect a deformation of the second region, in the expanded state, due to a force applied to the outer tactile surface by the user.

* * * * *